US012633969B2

(12) United States Patent
Zander et al.

(10) Patent No.: US 12,633,969 B2
(45) Date of Patent: May 19, 2026

(54) MULTI-DEVICE TRANSMISSION VIA COVERAGE ENHANCING DEVICE

(71) Applicant: Sony Group Corporation, Tokyo (JP)

(72) Inventors: Olof Zander, Basingstoke (GB); Kun Zhao, Basingstoke (GB); Erik Bengtsson, Basingstoke (GB); Fredrik Rusek, Basingstoke (GB); Jose Flordelis, Basingstoke (GB); Chaitanya Tumula, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 107 days.

(21) Appl. No.: 18/683,779

(22) PCT Filed: Aug. 17, 2022

(86) PCT No.: PCT/EP2022/072906
§ 371 (c)(1),
(2) Date: Feb. 15, 2024

(87) PCT Pub. No.: WO2023/021062
PCT Pub. Date: Feb. 23, 2023

(65) Prior Publication Data
US 2025/0125836 A1     Apr. 17, 2025

(30) Foreign Application Priority Data

Aug. 19, 2021   (SE) ..................................... 2151009-4
Dec. 16, 2021   (SE) ..................................... 2151540-8

(51) Int. Cl.
*H04B 7/04*       (2017.01)
*H04B 7/06*       (2006.01)

(52) U.S. Cl.
CPC ....... *H04B 7/04013* (2023.05); *H04B 7/0617* (2013.01)

(58) Field of Classification Search
CPC .................................................... H04B 7/04013
(Continued)

(56) References Cited

U.S. PATENT DOCUMENTS

2013/0057210 A1*   3/2013   Nergaard ................ B60L 53/11
                                                              320/109
2021/0013619 A1      1/2021   Alkhateeb et al.
(Continued)

FOREIGN PATENT DOCUMENTS

CN        110225538 A      9/2019
CN        111010219 A      4/2020
(Continued)

OTHER PUBLICATIONS

Xiaoling Hu et al., "Programmable Metasurface-Based Multicast Systems: Design and Analysis", IEEE Journal on Selected Areas in Communications, vol. 38, No. 8, Aug. 2022, pp. 1763-1776.
(Continued)

*Primary Examiner* — Lihong Yu
(74) *Attorney, Agent, or Firm* — XSENSUS, LLP

(57)     ABSTRACT

Various examples of the disclosure pertain to multi-device transmission via a coverage enhancing device such as a reconfigurable reflective device. Spatial filters are used at the coverage enhancing device that support a count of input spatial directions that is different than a count of output spatial directions.

19 Claims, 13 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 2024/0107423 A1* | 3/2024 | Ly | ......................... | H04W 36/08 |
| 2024/0283597 A1* | 8/2024 | Elshafie | .............. | H04B 7/0408 |

FOREIGN PATENT DOCUMENTS

| | | | |
|---|---|---|---|
| CN | 111416646 | A | 7/2020 |
| CN | 112804695 | A | 5/2021 |
| CN | 112822703 | A | 5/2021 |
| CN | 113193894 | A | 7/2021 |
| WO | 2021/109345 | A1 | 6/2021 |

OTHER PUBLICATIONS

Chongwen Huang et al., "Reconfigurable Intelligent Surfaces for Energy Efficiency in Wireless Communication", IEEE Transactions on Wireless Communications, vol. 18, No. 8, Aug. 2019, pp. 4157-4170.

Zhangjie Peng et al., "Multiuser Full-Duplex Two-Way Communications via Intelligent Reflecting Surface", arXiv:2006.05147v3, Jan. 4, 2021, pp. 1-18.

International Search Report and Written Opinion mailed on Nov. 14, 2022, received for International Patent Application No. PCT/EP2022/072906, filed on Aug. 17, 2022, 12 pages.

\* cited by examiner

100

120    150    110

150

7005

Obtain message indicative of capability
for multi-device transmission

7010

Request message indicative
of link quality

7015

Obtain message indicative
of link quality

7020

Provide message associated with
spatial filter(s)

7025

Obtain message indicative
of subset

7030

Request spatial filters

7035

Communicate signals
encoding payload data

8005
Provide message indicative of capability
for multi-device transmission

8006
Perform calculation of
spatial filters

8010
Obtain request for message indicative
of link quality

8015
Provide message indicative
of link quality

8020
Obtain message associated with
spatial filter(s)

8025
Provide  message indicative
of subset

8030
Obtain request for spatial filter(s)

8035
Reconfigure

FIG. 14

MULTI-DEVICE TRANSMISSION VIA COVERAGE ENHANCING DEVICE

CROSS-REFERENCE TO RELATED APPLICATIONS

This application is a national stage application, pursuant to 35 U.S.C. § 371, of International Patent Application No. PCT/EP2022/072906, filed Aug. 17, 2022, which claims priority from Swedish Patent Application Nos. 2151009-4, filed Aug. 19, 2021, and 2151540-8, filed Dec. 16, 2021, the contents of each are hereby incorporated by reference.

TECHNICAL FIELD

Various examples of the disclosure generally relate to communication via a coverage enhancing device such as a re-configurable relaying or reflective device. Various examples specifically relate to a multi-device transmission.

BACKGROUND

To increase a coverage area for wireless communication, it is envisioned to use coverage enhancing devices (CEDs), particularly re-configurable relaying devices (RRD) or more particularly re-configurable reflective devices. Re-configurable reflective devices are sometimes also referred to as reflecting large intelligent surfaces (LISs). See, e.g., Huang, C., Zappone, A., Alexandropoulos, G. C., Debbah, M., & Yuen, C. (2019). Reconfigurable intelligent surfaces for energy efficiency in wireless communication. IEEE Transactions on Wireless Communications, 18(8), 4157-4170.

An RRD can be implemented by an array of antennas that can reflect incident electromagnetic waves/signals. The array of antennas can be semi-passive. Semi-passive can correspond to a scenario in which the antennas can impose a variable phase shift and typically provide no signal amplification. An input spatial direction (or simply, input direction) from which incident signals on a radio link are accepted and an output spatial direction (or simply, output direction) into which the incident signals are redirected can be re-configured by changing a phase relationship between the antennas. A radio link may refer to a radio link specified by the Third Generation Partnership Project (3GPP) standard. In particular, the radio link may refer to a physical radio link. The radio link may offer several time/frequency resources for communication between different communication nodes of a communication system.

An access node (AN) may transmit signals to a wireless communication device (UE) via a CED. The CED may receive the incident signals from an input spatial direction and transmit the incident signals in an output spatial direction to the UE. The AN may transmit the signals using a beam directed to the CED.

Scenarios are possible where multiple UEs are served via a CED. See WO 2021 109 345 A1.

SUMMARY

There is a need for advanced techniques of communicating via a CED. Specifically, there is a need for techniques which facilitate communicating contemporaneously with multiple communication nodes via a CED.

This need is met by the features of the independent claims. The features of the dependent claims define embodiments.

Various techniques disclosed herein facilitate communicating between a first communication node (CN) and multiple second CNs via a CED.

The CED may be arranged in the electromagnetic far field of the first CN. The CED could be arranged in the surrounding or far field of the second CN.

For instance, multiple UEs can be served by an AN via a CED.

It would also be possible that a UE communicates with multiple ANs.

Therefore, sometimes, the incident electromagnetic waves propagating along an input spatial direction can be transmitted into multiple output spatial directions, to thereby support a multi-device transmission (MDT). This is also known as branching-out the input data stream. Also, incident electromagnetic waves propagating along multiple input spatial directions can be transmitted into a single output spatial direction, to thereby support the multi-device transmission. This may also be referred to as bonding together the multiple input data streams.

The MDT, more generally, defines an N-to-M scenario where N input spatial directions and M output spatial directions are used for a single data stream, with N≈M. Typically, either N=1 and/or M=1; but it would also be possible that N≈1 and M≈1.

Communication supported by the MDT can be of broadcast or multi-cast type. Communication can be structured in the time domain, e.g., using time division multiplexing (TDM). Here, the TDM switching frequency is higher than the re-configuration frequency of the CED. In a multi-user, multiple-input multiple-output (MU-MIMO) scenario, it is possible to enhance the "channel richness" by obtaining an additional path to all UEs via the CED.

As a general rule, the MDT can facilitate transmission of a single data stream. I.e., MDT does not refer to polarization-based multiplexing. For instance, a MDT can be implemented for vertical polarization of electromagnetic waves of the signal transmitted by the transmitter device. A further MDT can be implemented for horizontal polarization of electromagnetic waves of a further signal transmitted by the transmitter device. Instead of using vertical and horizontal polarization, it would also be possible to use leftcircular and right-circular polarization.

It has been observed that—for such MDT via the CED—there is significant loss for certain combinations of UE locations, e.g., power or efficiency loss or a channel gain loss. Other combinations of UE locations face reduced loss. Thus, it has been observed that it can be difficult to configure MDT in a reliable manner.

Various examples disclosed herein facilitate configuring MDT in a reliable and overhead-efficient manner.

A method of operating a first CN—e.g., an AN—is provided. The method includes obtaining a message. The message is indicative of a capability of a CED to output incident signals that are received along one or more input spatial directions into one or more output spatial directions, such that a count of the one or more input spatial directions is different than a count of one or more output spatial directions. The CED is reconfigurable to provide multiple spatial filters. The multiple spatial filters are associated with at least one of the one or more input spatial directions from which incident signals on the radio link are accepted, as well as with at least one of the one or more output spatial directions in which the incident signals are output by the CED.

Thus, the message can be indicative of a capability of the CEDs to support a multidevice transmission. For instance, the CED can receive incident electromagnetic waves along a single input spatial direction (N=1) and output the incident electromagnetic waves into multiple output spatial directions (M>1); this scenario may be referred to as single-input multi-output (SIMO) multi-device transmission. Thereby, a single incident data stream—including signals that encode payload data—on a radio link can be branched out towards multiple UEs in the surrounding of the CED. For instance, broadcast or multi-cast signals can be provided to the multiple UEs. Time division multiplexing could be employed to sequentially address different ones of the multiple UEs Similarly, the CED can receive incident electromagnetic waves along multiple input spatial directions (N>1) and output the incident electromagnetic waves into a single output spatial direction (M=1); this scenario is referred to as multi-input single-output (MISO) multi-device transmission. Thereby, multiple incident data streams—originating from, e.g., multiple UEs—can be bonded into a single data stream that is, e.g., provided to an AN. For instance, the multiple UEs can be operated in a synchronized manner and employ TDM.

Thus, when using multi-device transmission, multiple second CNs are served by the first CN using fewer or only a single spatial filter of the CED. These spatial filters are referred to as multi-device transmission (MDT) spatial filters: this means that MDT spatial filters support contemporaneously transmitting incident signals into multiple output spatial directions and/or receiving incident signals from multiple input spatial directions. This is typically different for single-device transmission (SDT) spatial filters.

Depending on the implementation of the CED, "receiving" and "transmitting" signals at the CED can take various forms. For instance, for a re-configurable reflective device, reflection at reflective elements of a reflective surface is used to forward incident signals. Here, the phase shift can be changed across the unit cells of the reflective surface; however, the gain per unit cell cannot be tailored. For re-configurable relaying devices, the gain per unit cell may be tailored, e.g., by applying a unit-cell-specific damping or, in some scenarios, even a unit-cell-specific amplification.

Thus, the re-configurable relaying devices can be labeled an "active CED", while a reconfigurable reflective device can be labeled "passive CED". For an active CED, the transmission direction can be considered. For an active CED, the outgoing signal may be transmitted at a timing offset with respect to the incident signals. Relaying can use half duplex operation or full duplex operation. On the other hand, for a passive CED, the outgoing signal is transmitted at the same time as the incident signals arriving at the CED. There is no amplification. As a general rule, the techniques disclosed herein can be applicable to active CEDs as well as passive CEDs.

By using the message that is indicative of the capability of the CED to support multidevice transmission, the communication of one or more signals encoding payload data between the first CN and the CED can be facilitated. Where available, the MDT may be activated. For instance, it could be checked whether the MDT offers benefits over a single-user transmission—where each UE is served by a respective spatial filter of the CED—e.g., in terms of individual or total data throughput.

According to various examples, the message indicative of the capability could be indicative of whether the CED generally supports multi-device transmission or not.

According to examples, it would be possible that the message is obtained from the CED. The message can be obtained on a control link that is different to the radio link that is used to communicate signals encoding payload data. Thereby, the CED can provide information regarding its capability, e.g., regarding the expected quality for communicating signals on the radio link for different spatial filters, e.g., to the AN or the UE. The message could also be received from a control node of the CED. The control node could be a CED server. The CED server can be in charge of controlling multiple CEDs.

As a general rule, various options are available for distributing logic to select one or more MDT spatial filters. For instance, the logic may primarily reside at the first CN, e.g., the AN. The CED may also be involved. Some examples are explained below.

In a first option, it would be possible that a message is provided to the CED for configuring the CED to contemporaneously reflect the incident signal—the signal being incident along an input spatial direction—into multiple output spatial directions, wherein the message is indicative of a power distribution between output signals reflected along different ones of the multiple output directions. Accordingly, multiple antenna elements can be configured at the CED to apply phase shifts to reflect the incident signal into the multiple output directions.

In addition, certain gains to affect the amplitude may be applied, for active CEDs.

For instance, the message may include a data element. The data element can include a value that defines the power distribution. For instance, the data element could take a value that corresponds to a 50%:50% power distribution between two output directions. Another value could correspond to 20%:80% power distribution between two output directions. For instance, the message could selectively include the data element and an absence of the data element in the message could indicate a default value of the power distribution.

In some instances, the message could indicate each one of the multiple output directions, e.g., by employing a pointer to a predefined setting, e.g., including certain beam identities, referring to a timing of respective single-device transmission spatial filters currently employed by the CED, etc.

For each set of output spatial directions, there can be multiple spatial filters available, to enable different power distributions between those output spatial directions.

The particular spatial filter to be applied at the CED can be determined at the CED, under the constraint of the power distribution. The CED can thus be partially controlled by another communication node, by setting the desired power distribution.

It would be possible that the CED calculates the phase shifts (and optionally amplitude gains) for the antenna elements upon receiving the message that is indicative of the power distribution. Thus, it would be possible that the respective spatial filter is calculated ad hoc (e.g., rather than employing a codebook). For instance, such calculation could be based on settings of the antenna elements currently used to reflect signals into the multiple output spatial directions in a single device transmission. This means, in other words, that the phase shifts of the multiple antenna elements for the MDT into multiple output spatial directions can be calculated based on further phase shifts used to serially reflect other signals into the multiple output spatial directions in respective SDTs. Thus, the spatial filter for the MDT can be derived from spatial filters used for SDT into corresponding output spatial directions.

Such techniques of ad hoc calculation of the phase shifts (and optionally amplitude gains) are also applicable for scenarios where multiple input spatial directions are fused at the CED, i.e., for MISO MDT.

In a second option—alternatively or additionally to providing the power distribution to the CED—the method may further include providing a message indicative of a set of input spatial directions or a set of output spatial directions to the CED, e.g., as candidates for the MDT. A respective selection may be based on known locations of the second CNs. For instance, a set of output spatial directions via which multiple UEs may be served may be provided to the CED. Alternatively or additionally, a set of input spatial directions that could be addressed by the AN may be provided to the CED.

Accordingly, the set of input spatial direction or output spatial directions can serve as candidates of the MDT for which the expected quality may be determined. The set of input spatial directions or output spatial directions may, in particular, only include a fraction of all available input spatial directions or output spatial directions that can be served by the CED in the MDT. Thereby, the amount of information to be exchanged between the first CN and the CED can be reduced.

As a general rule, in the various disclosed examples there are various options available of indicating input and/or output spatial directions. For instance, directional information—e.g., azimuthal and/or elevation angle—may be indicated. Alternatively or additionally, indices of the MDT spatial filters associated with those directions could be signaled. It would be possible to refer to time slots during which respective output spatial directions are—e.g., currently or previously—served using SDT spatial filters. Thus, by reference to SDT spatial filters respective output spatial directions can be defined, not requiring (re-)signaling of respective information.

In some scenarios, the method may further include obtaining—e.g., from the CED—a message that is indicative of one or more subsets of the set of input spatial directions or the set of output spatial directions. I.e., the CED may respond with a reduced number of input spatial directions or output spatial directions. For instance, certain input spatial directions or output spatial directions included in the respective set, but not included in the subset may have low link quality and, therefore, may be ruled out by the CED.

According to various examples, the method may further include providing, e.g., to the CED, a message requesting the CED to apply one or more MDT spatial filters according to the set of input spatial directions or the set of output spatial directions or the one or more subsets. I.e., it would be possible that a final selection of the one or more MDT spatial filters to be activated is implemented at the first CN, e.g., the AN.

For example, it would be possible for, e.g., the first CN to provide priorities associated with the spatial directions in the input and/or output sets. For example, some spatial directions can have high priority; other directions can have low priority. The CED can then take into account this priority setting. For example, the CED is not allowed to consider low priority directions unless all high priority ones have been satisfied first.

The method may then further include communicating, between the first CN and the CED and on the radio link, one or more signals that encode payload data. Each one of the one or more signals is associated with the one or more MDT spatial filters that are applied. The different input spatial directions or output spatial directions can be associated with different second CNs.

As a general rule, there are various options available for selecting the one or more MDT spatial filters and/or for determining a (desired) power distribution between multiple output and/or multiple input spatial directions. For instance, it would be possible that the first CN obtains a message that is indicative of a link quality associated with the one or more output spatial directions or the one or more input spatial directions from the CED. This message could be the same message that is indicative of the capability of the CED, or another message. The link quality can specify the expected received signal power or the expected path loss when implementing a respective MDT spatial filter. The link quality could specify an expected error rate, e.g., block error rate. Such information may be determined based on channel sounding using reference signals, e.g., downlink and/or uplink reference signals communicated between first and second CNs.

For instance, according to some examples, the link quality could be provided in absolute terms for multiple input spatial directions and multiple output spatial directions. The link quality could also be indicated in relative terms, e.g., with respect to a baseline that could, e.g., be defined by a SDT for the same output or input spatial direction.

It would also be possible that the link quality is indicated in an aggregated manner, i.e., using information that applies to more than a single input spatial direction or more than a single output spatial direction. Thereby, control signaling overhead can be reduced.

For instance, it would be possible that the message indicative of the link quality includes an indication of a minimum link quality of different ones of the one or more output spatial directions or the one or more input spatial directions. Thus, a worst-case scenario could be signaled.

It would also be possible that the message indicative of the link quality includes an indication of a relative link quality of different ones of the one or more output spatial directions or the one or more input spatial directions. For instance, the link quality of a first set of multiple output spatial directions could be compared with the link quality of a second set of different multiple output directions. For instance, it could be indicated that the first set of the multiple output spatial directions has a lower loss at the CED than the second set of the multiple output spatial directions. This could be quantified. Also, a ranking without quantification could be provided.

The message indicative of the link quality may be provided upon request. Therefore, it would be possible that the first CN provides, e.g., to the CED, a respective request message.

In some examples, the first CN may provide, to the CED, a message that is indicative of a measured link quality of the multiple second CNs. The first CN may communicate with the multiple second CNs on the radio link via the CED, using SDT respective spatial filters. Then, it would be possible that the respective link qualities for SDT are reported to the CED which may, in turn, select appropriate MDT spatial filters and/or an appropriate power distribution. Specifically, the reported link qualities can be used as baselines and it would be possible to check whether a further degradation of the link quality vis-à-vis the baseline is still acceptable, e.g., in view of quality-of-service requirements.

Accordingly, it would be possible that the first communication device provides a message that is indicative of a required link quality associated with the one or more output spatial directions of the one or more input spatial directions. Then, the CED can use appropriate MDT spatial filters meeting a respective constraint defined by the required link quality, e.g., by providing an appropriate power distribution.

A computer program or a computer-program production or a computer-readable storage medium includes program code. The program code can be loaded and executed by at least one processor. Upon loading and executing the program code, the at least one processor performs a method of operating a first CN. The method includes obtaining a message. The message is indicative of a capability of a coverage enhancing device (CED) to transmit incident signals that are received along one or more input spatial directions into one or more output spatial directions, such that a count of the one or more input spatial directions is different than a count of the one or more output spatial directions. The CED is reconfigurable to provide multiple spatial filters. Each one of the multiple spatial filters is associated with at least one of the one or more input spatial directions from which incident signals on a radio channel are accepted and with at least one of the one or more output spatial directions into which the incident signals are transmitted by the CED.

A first CN includes a control circuitry. The control circuitry is configured to obtain a message that is indicative of a capability of a CED to transmit incident signals that are received along one or more input spatial directions into one or more output spatial directions, such that a count of the one or more input spatial directions is different than a count of the one or more output spatial directions. The CED is reconfigurable to provide multiple spatial filters. Each one of the multiple spatial filters is associated with a least one of the one or more input spatial directions from which incident signals on a radio channel are accepted and with at least one of the one or more output spatial directions into which the incident signals are transmitted by the CED.

A method of operating a CED is provided. The CED is reconfigurable to provide multiple spatial filters. Each one of the multiple spatial filters is associated with a respective input spatial direction from which incident signals on a radio channel are accepted, as well as with one or more respective output spatial directions into which the incident signals are transmitted by the CED. The method includes providing, to a first communication node, a message that is indicative of the capability of the CED to transmit incident signals received along one or more input spatial directions into one or more output spatial directions such that a count of the one or more input spatial directions is different than a count of the one or more output spatial directions.

A computer program or a computer-readable storage medium or a computer program product includes program code. The program code can be loaded and executed by a processor. Upon loading and executing the program code, the processor performs a method of operating a CED. The CED is reconfigurable to provide multiple spatial filters. Each one of the multiple spatial filters is associated with a respective input spatial direction from which incident signals on a radio channel are accepted, as well as with one or more respective output spatial directions into which the incident signals are transmitted by the CED. The method includes providing, to a first communication node, a message that is indicative of the capability of the CED to transmit incident signals received along one or more input spatial directions into one or more output spatial directions such that a count of the one or more input spatial directions is different than a count of the one or more output spatial directions.

A CED is provided. The CED is reconfigurable to provide multiple spatial filters. Each one of the multiple spatial filters is associated with a respective input spatial direction from which incident signals on a radio channel are accepted, as well as with one or more respective output spatial directions into which the incident signals are transmitted by the CED. The CED includes control circuitry configured to provide, to a first CN, a message that is indicative of the capability of the CED to transmit incident signals that are received along one or more input spatial directions into one or more output spatial directions, such that a count of the one or more input spatial directions is different than a count of the one or more output spatial directions.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 14 is a signaling diagram of communication between various CNs via a CED according to various examples.

DETAILED DESCRIPTION

Figure 1:
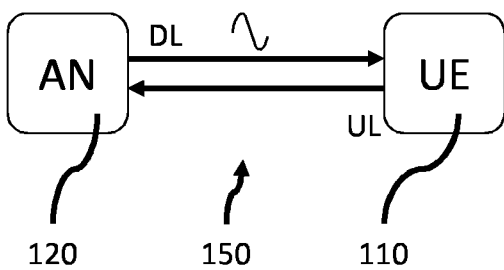
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between CNs. A wireless communication system includes a transmitter CN and one or more receiver CNs. Alternatively or additionally, the wireless communication system can include multiple transmitter CNs and a single receiver CN. In some examples, the wireless communication system can be implemented by a wireless communication network, e.g., a radioaccess network (RAN) of a Third Generation Partnership Project (3GPP)-specified cellular network (NW). In such a case, the transmitter CN can be implemented by an AN, in particular a base station (BS), of the Radio Access Network (RAN), and the one or more receiver nodes can be implemented by terminals (also referred to as user equipment, UE). It would also be possible that the transmitter CN is implemented by a UE and the one or more receiver CNs are implemented by one or more ANs and/or further UEs.

Hereinafter, for the sake of simplicity, various examples will be described with respect to an example implementation of the transmitter CN by an AN and the one or more receiver CN by UEs—i.e., to downlink (DL) communication; but the respective techniques can be applied to other scenarios, e.g., uplink (UL) communication and/or sidelink (between UEs) communication. Sidelink communication pertains to communication between two peer UEs connected or connectable to a cellular network.

According to various examples, the transmitter CN can communicate with one or more receiver CNs via a CED.

A CED may include an antenna array. The CED may include a meta-material surface. In examples, the CEDs may include a reflective antenna array (RAA). The CED can be a re-configurable reflective device.

There are many schools-of-thought for how CEDs should be integrated into 3GPP-standardized RANs.

In an exemplary case, the NW operator has deployed the CEDs and is, therefore, in full control of the CEDs' operations. The UEs, on the other hand, may not be aware of the presence of any CED, at least initially, i.e., it is transparent to a UE whether it communicates directly with the AN or via the CEDs. The CEDs essentially function as a coverage-extender of the AN. The AN may have established control links with the CEDs.

According to another exemplary case, it might be a private user or some public entity that deploys the CEDs. Further, it may be that the UE, in this case, controls the CEDs' operations. The AN, on the other hand, may not be aware of the presence of any CED and, moreover, may not have control over it/them whatsoever. The AN may gain awareness of the presence of a CED by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the CED. It is also possible that the AN gains awareness of the presence of a CED using UWB (Ultra wideband) communication. Using UWB may offer better time resolution due to the wider bandwidth compared to other radio technologies.

The two exemplary cases described above are summarized in TAB. 1 below.

TABLE 1

Scenarios for CED integration into cellular NW.

| Scenario | Description | Explanation |
|---|---|---|
| A | AN-CED control link | AN controls the CED and/or can obtain information from the CED. A control link is established between the AN and the CED. |
| B | UE-CED control link | UE controls the CED and/or can obtain information from the CED. A control link is established between the UE and the CED. |

According to various examples, an MDT is facilitated by the CED using one or more MDT spatial filters.

For instance, the MDT can include a single data stream from the BS to two UEs via a CED. The CED can include a reflective surface—e.g., an RAA—with N unit cells; the channel to the reflective surface is denoted with g, a $1 \times N$ vector. Each unit cell of the reflective surface of the CED can alter its reflected signal by a factor which we refer to as $c_n$. The signal then arrives at two UEs A and B, via two separate channels $v_1$ and $v_2$ ($1 \times N$ vectors).

With that, the channel between the BS and the two UEs—i.e., the radio link—becomes $$\begin{bmatrix} h_1 \\ h_2 \end{bmatrix} = \begin{bmatrix} v_1 C g^T \\ v_2 C g^T \end{bmatrix}$$

where C is a diagonal matrix with the elements $c_n$ along its main diagonal. Simple manipulations give $$\begin{bmatrix} h_1 \\ h_2 \end{bmatrix} = \begin{bmatrix} (v_1 \circ g)c \\ (v_2 \circ g)c \end{bmatrix} = \begin{bmatrix} z_1 c \\ z_2 c \end{bmatrix}$$

where c is a column vector containing elements $c_n$, and $v \circ g$ denotes the elementwise product of v and g. The above means the following: If the data value x is transmitted from the BS, then if the reflective surface of the CED applies the values $c_n$, UE A and UE B receive the values $h_1 x$ and $h_2 x$, respectively.

For the antenna elements of the CED, the objective now becomes to select elements $c_n$ defining the respective phase shifts applied to incident signals (or more accurately to incident plane electromagnetic waves)—i.e., configure an MDT spatial filter—so that the values $h_1$ and $h_2$ are, in some sense, optimal.

As a general rule, it would in principle also be possible to determine amplitude gains for an active CED. For the sake of simplicity, hereinafter, techniques are only described in connection with calculating phase shifts.

According to various examples, a determination—e.g., a calculation such as an optimization—of the MDT spatial filter can be implemented, e.g., at the CED or a control device of the CED. The MDT spatial filters can also be predefined, e.g., in accordance with a pre-executed determination. Here, one or more performance characteristics—e.g., the CED signal gain for each input or output spatial direction—can be stored along the with MDT spatial filters.

As a general rule, various performance criteria for determining the appropriate MDT spatial filter are conceivable. Some performance criteria that depend on the signal gains for each UE of multiple UEs at the CED are summarized in TAB. 2 below.

TABLE 2

Various options for performance characteristics for determining MDT spatial filters, e.g., using an iterative optimization (examples I-V) or a feedforward calculation (example VI). Illustrated is the impact of the respective performance characteristic onto a CED signal gain $|h_i|^2$ at the respective UEs (indexed with i).

| | Performance goal | Example details |
|---|---|---|
| I | Maximize capacity/ sum capacity | For example, the target function of an optimization used for calculating the phase shifts could be $$\max_{\{c_n\}} \log(1 + |h_1|^2/N_0) + \log(1 + |h_2|^2/N_0)$$ This choice is optimal from a network capacity perspective, but may lead to individual UEs receiving very low power due to small CED signal gain $|h_i|$ for that UE. The capacity can be defined by the supremum of the data rates of all communication strategies. By maximizing the capacity, the overall data throughput can be maximized. |
| II | Sum of received power maximized | For example, the target function of an optimization used for calculating the phase shifts could be $$\max_{\{c_n\}} |h_1|^2 + |h_2|^2$$ This optimization is typically somewhat simpler than example I, as it is SNR-independent and quadratic in $\{c_n\}$, but suffers from the same drawback of potentially small CED signal gains $|h_i|$ for individual UEs. |
| III | Maximize minimum received power | For example, the target function of an optimization used for calculating the phase shifts could be $$\max_{\{c_n\}} \min(|h_1|^2, |h_2|^2)$$ |

TABLE 2-continued

Various options for performance characteristics for determining MDT spatial filters, e.g., using an iterative optimization (examples I-V) or a feedforward calculation (example VI). Illustrated is the impact of the respective performance characteristic onto a CED signal gain $|h_i|^2$ at the respective UEs (indexed with i).

| Performance goal | Example details |
|---|---|
| IV  Fairness based | This choice aims at ensuring a certain QoS for each UE. Optimize them with some form of fairness in mind: For example, the target function of an optimization used for calculating the phase shifts could be |

$$\max_{\{c_n\}} |h_1|^2 + |h_2|^2, \quad \text{such that} \quad \frac{\min(|h_1|^2, |h_2|^2)}{\max(|h_1|^2, |h_2|^2)} \geq \delta$$

| | |
|---|---|
| | This means that the worst UE's CED signal gain is at least a fraction $\delta$ of the best UE's CED signal gain. |
| V  Quality of service based | Optimize according to a QoS per UE: For example, the target function of an optimization used for calculating the phase shifts could be<br>find $\{c_n\}$, such that $|h_1|^2 \geq \delta_1$ and $|h_1|^2 \geq \delta_2$<br>Note that not all pairs $\delta_1$ and $\delta_2$ are possible. |
| VI  Power distribution | Calculate a spatial filter that provides an incident signal at a certain output power distribution P to multiple spatial directions<br>$|h_1|^2 = P|h_2|^2$<br>For instance, a non-equal power distribution $(P \neq 1)$ may be desirable, where one of two UEs is farther away than the second one of the two UEs. For example, the UE farther away should obtain a higher fraction of the signal power to maintain a high received signal strength.<br>Techniques will be described which facilitate such a calculation in a feedforward manner, i.e., not implementing an iterative optimization that maximizes or minimizes the target function.<br>It has been empirically found that it is possible to implement, based on the power distribution, an N × 1 vector c denoting the MDT spatial filter with $|c_n| = 1$, $\forall n$ that is optimal in the following sense<br>$c = \text{argmax}_{c, |c_n|=1, \forall n} \min(|s(\theta_{o1})c|^2, |s(|s(\theta_{o2})c|^2)$<br>Where $s(\theta_{o1})$ and $s(\theta_{o2})$ are steering vectors towards two output directions associated to different devices.<br>In other words, it is possible to calculate an MDT spatial filter such that the minimum gain/signal-to-noise-ratio/received power of the two users associated with the two output spatial directions is maximized. |

Various scenarios disclosed herein are based on the finding that some MDT spatial filters—e.g., MDT spatial filters selected based on the determination according to TAB. 2 above—result in low signal gains $|h_1|^2$ and $|h_2|^2$ for most combinations of UE locations, even when SDT results in individual high signal gains. Further, the imbalance between the CED signal gains $|h_1|^2$ and $|h_2|^2$ depends heavily on the optimization goal. Thus, activating MDT may not always be favorable compared to using SDT.

To illustrate this finding, a few practical examples are provided below:

Example 1. Assume two UEs in the same elevation plane as the reflective surface of the CED, but UE A has azimuth angle 20° to the surface, while UE B has azimuth angle −20°. The reflective surface has N unit cells/antenna elements. If the UEs A and B are served uniquely by the CED, i.e., only UE A or UE B are present and SDT is activated (i.e., the UEs have to be served alternatingly, using time multiplexing), then both UEs obtain $|h_1|^2 = |h_2|^2 = A$. (The precise value of A is distance dependent.) On the other hand, if both UEs A and B are served simultaneously in a SIMO MDT and optimization II of TAB. 2 is used, then the UEs obtain $|h_1|^2 = |h_2|^2 \approx 0.51$ A. The number 0.51 depends on N, but generally a little more than half of the power A is received. In essence, this means that the "input power has been split" between the UEs.

Example 2. Example 2 is based on Example 1 above. However, it is now assumed that UE B has azimuth −30° to the reflective surface. If the two UEs are served individually using SDT, again $|h_2|^2 \approx |h_1|^2 = A$. If both UEs A and B are simultaneously served in a SIMO MDT and optimization II of TAB. 2 is used, then UE A obtains $|h_1|^2 \approx 0.81$ A while UE B obtains $|h_2|^2 \approx 0.20$ A, respectively. In this case, we can say that the beam has been split, but in a very unfair way. Still, this unfair beam splitting maximizes the total received power at the two UEs, and it is not unlikely that a reflective surface would act in this way.

Example 3. In this example, optimization III of TAB. 2 is used, solved via numerical searches. The angular setting is the same as in Example 2 above. Then: $|h_2|^2 \approx |h_1|^2 \approx 0.3$ A. Thus, if the reflective surface is optimized for QoS, both UEs receive fairly low power, but UE B receives more power than in Example 2.

Accordingly, according to some examples, techniques are described which facilitate dynamic activation or deactivation of MDT, e.g., depending on the link quality. The techniques facilitate selection of the appropriate MDT spatial filter, where MDT is activated.

The CED is reconfigurable to provide multiple spatial filters, each one of the multiple spatial filters being associated with at least one of the one or more input spatial directions from which incident signals on a radio link are accepted and with at least one of the one or more output spatial directions into which the incident signals are transmitted by the CED. The spatial filters are represented by vectors c. These vectors define the setting for each reconfigurable unit cell, i.e., the respective phase shifts applied to incident signals. Typically, the CED serves a single UE, wherefore it has a set of spatial filters for single UE service. The SDT spatial filters for single-device transmission are denoted by $$c_1^1, c_2^1, \dots, c_K^1,$$

where K denotes the total number of spatial filters, and the superscript "1" indicates that these beams are intended for single-device service. Some of these SDT spatial filters may be of worse quality than others, for example because the associated output spatial directions are directed towards angles almost parallel to the surface. Therefore, the CED can define a list of quality indicators $\{I_1, I_2, \dots, I_K\}$ associated with, e.g., a gain of each SDT spatial filter. For instance, a maximum may be normalized to unity and $I_k$ may indicate a relative strength of spatial filter k. Note that absolute numbers typically cannot be given, since the received power at the UE depends on the path loss between the CED and the UE. In practice, this list would likely comprise numbers very close to 1, so it is not of major interest.

Next, the MDT scenario is discussed. For instance, a scenario may be considered where the AN serves, using TDM, two UEs, one using an SDT spatial filter $c_i^1$ and one using an SDT spatial filter $$c_j^1.$$

Assume that $I_i \approx I_j \approx 1$. Then, the AN may be interested in broadcasting to the two UEs simultaneously using SIMO MDT and a respective MDT spatial filter. However, this does not mean that the AN can expect that the received powers at the two UEs should be (relatively) 0.5 if it indicates to the CED to split the beam towards the two UEs simultaneously. This is so since the actual received powers at the UEs depend on the particular output spatial directions, typically not known to the UE, and the type of optimization underlying the configuration of the MDT spatial filter.

Accordingly, it is possible that the overall communication quality degrades from a SISO SDT to a SIMO MDT.

According to various examples disclosed herein, it is possible to configure one or more spatial filters for an MDT. Specifically, according to various examples, a capability associated with the MDT can be communicated. For instance, the general capability of the CED to support MDT can be indicated, e.g., whether MDT spatial filters are available. For example, if the CED has some MDT spatial filters available, the CED may signal, to the AN, that it is capable of supporting the MDT. For instance, it would also be possible that the CED provides further information associated with such MDT spatial filters. For instance, the signal gains associated with different output spatial directions of an MDT spatial filter could be indicated, e.g., their relative ratio or the absolute value. For instance, the spatial output directions associated with each MDT spatial filter could be indicated. Expected link qualities could be communicated. Expected CED gains for each output or input spatial direction could be signaled. Lower thresholds for the CED gains could be signaled, i.e., minimum acceptable CED gains that should be supported.

According to further examples disclosed herein, a communication protocol is described that enables efficient exchange of such further information associated with the MDT.

According to still further examples disclosed herein, calculation techniques are disclosed which facilitate determining the phase shifts to be configured at the antenna elements of the CED to provide an MDT spatial filter having high performance.

FIG. 1 schematically illustrates a communication system 100. The communication system 100 includes two nodes 110, 120 that are configured to communicate with each other via a radio link 150. In the example of FIG. 1, the node 120 is implemented by an AN and the node 110 is implemented by a UE. The AN 120 can be part of a cellular NW (not shown in FIG. 1). The UE could be, e.g., a smartphone, a tablet PC, a smartwatch, a smart TV, a smart meter, to give just a few examples.

As a general rule, the techniques described herein could be used for various types of communication systems, e.g., also for peer-to-peer communication, etc. For the sake of simplicity, however, hereinafter, various techniques will be described in the context of a communication system that is implemented by an AN 120 of a cellular NW and a UE 110.

As illustrated in FIG. 1, there can be DL communication, as well as UL communication. Examples described herein particularly focus on the DL communication, but similar techniques may be applied to UL communication and/or sidelink communication. Input sweep and receive beam sweep may relate to DL communication and output sweep and transmit beam sweep may relate to UL communication.

Figure 2:
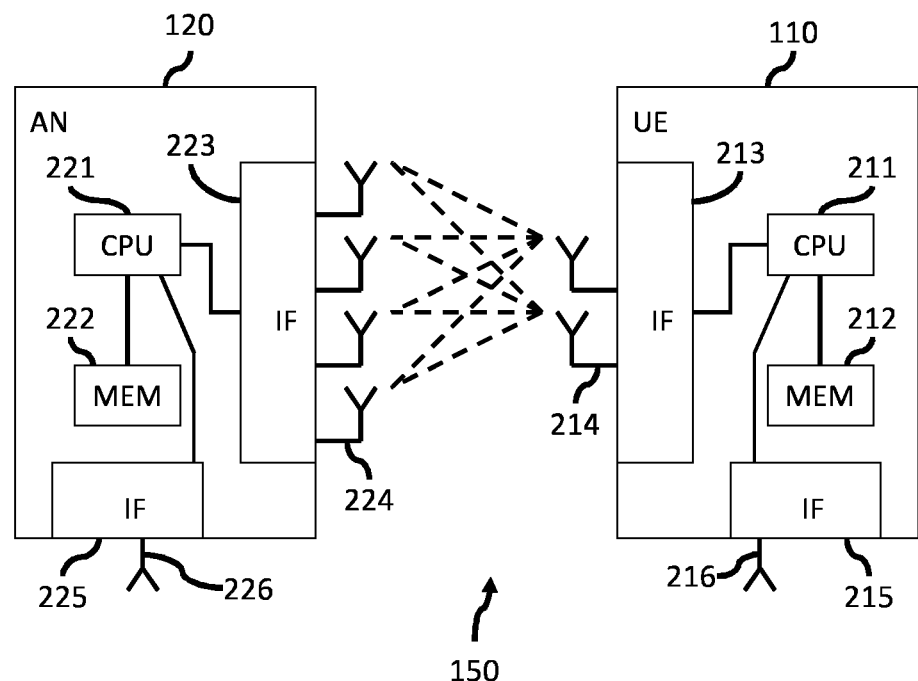
FIG. 2 schematically illustrates details of the communication system of FIG. 1 according to various examples.

FIG. 2 illustrates details with respect to the AN 120. The AN 120 includes control circuitry that is implemented by a processor 221 and a non-volatile memory 222. The processor 221 can load program code that is stored in the memory 222. The processor 221 can then execute the program code. Executing the program code causes the processor to perform techniques as described herein.

Moreover, FIG. 2 illustrates details with respect to the UE 110. The UE 110 includes control circuitry that is implemented by a processor 211 and a non-volatile memory 212. The processor 211 can load program code that is stored in the memory 212. The processor can execute the program code. Executing the program code causes the processor to perform techniques as described herein.

Further, FIG. 2 illustrates details with respect to communication between the AN 120 and the UE 110 on the radio link 150. The AN 120 includes an interface 223 that can access and control multiple antennas 224. Likewise, the UE 110 includes an interface 213 that can access and control multiple antennas 214.

The UE 110 comprises a further interface 215 that can access and control at least one antenna 216 to transmit or receive a signal on an auxiliary link different from the radio link 150. Likewise, the AN 120 may comprise an additional interface 225 that can access and control at least one antenna 226 to transmit or receive a signal on the or a further auxiliary link different from the radio link. In general, the interface 225 may also be a wired interface. If a wireless interface is used, the auxiliary link may use in-band signaling or out-of-band signaling. The radio link and the auxiliary link may be offset in frequency. The auxiliary link may be at least one of a Bluetooth radio link, a WiFi channel, or an ultra-wideband radio link. Methods for determining an angle of arrival may be provided by a communication protocol associated with the auxiliary link. For example, methods for determining an angle of arrival may be provided by a Bluetooth radio link.

While the scenario of FIG. 2 illustrates the antennas 224, 226 being coupled to the AN 120, as a general rule, it would be possible to employ transmit-receive points (TRPs) that are spaced apart from the AN 120.

The interfaces 213, 223 can each include one or more transmitter (TX) chains and one or more receiver (RX) chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 214, 224. Thereby, the AN 120 and the UE 110 can selectively transmit on multiple TX beams (beamforming), to thereby direct energy into distinct spatial directions.

By using a TX beam, the direction of the wavefront of electromagnetic waves transmitted by a transmitter of the communication system is controlled. Energy is focused into a respective direction or even multiple directions, by phase-coherent superposition of the individual signals originating from each antenna 214, 224. Energy may also be focused to a specific point (or small sphere) at a specific direction and a specific distance of the transmitter. Thereby, a data stream may be directed in multiple spatial directions and/or to multiple specific points. The data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figure 3:
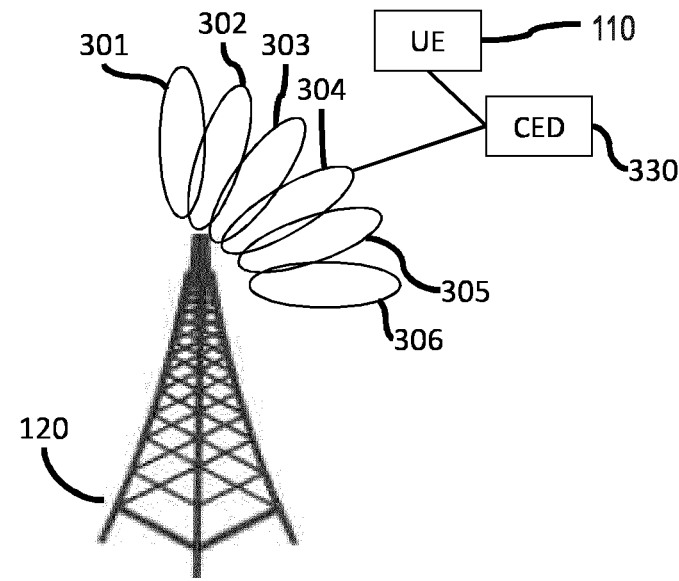
FIG. 3 schematically illustrates communication via a CED according to various examples.

FIG. 3 illustrates DL TX beams 301-306 used by the AN 120. Here, the AN 120 activates the beams 301-306 on different resources (e.g., different time-frequency resources, and/or using orthogonal codes/precoding, and/or using different polarizations) such that the UE 110 can monitor for respective signals transmitted on the DL TX beams 301-306.

It is possible that the AN 120 transmits signals to the UE 110 via a CED 330. In the scenario of FIG. 3, the DL transmit beam 304 is directed towards the CED 330. Thus, whenever the AN 120 transmits signals to the UE 110 using the DL transmit beam 304—e.g., a respective block of a burst transmission—, a spatial filter is provided by the CED 330. The spatial filter is associated with an input spatial direction from which signals are accepted; this input spatial direction is selected by using the DL transmit beam 304. Typically, this input spatial direction remains relatively static. The spatial filter is further associated with at least one spatial direction into which the incident signals are then transmitted by the CED 330. For an SDT spatial filter, incident signals are reflected into a single output spatial direction; while for an MDT spatial filter, incident signals are reflected into multiple output spatial directions. Details with respect to the CED 330 are illustrated in connection with FIG. 4.

Figure 4:
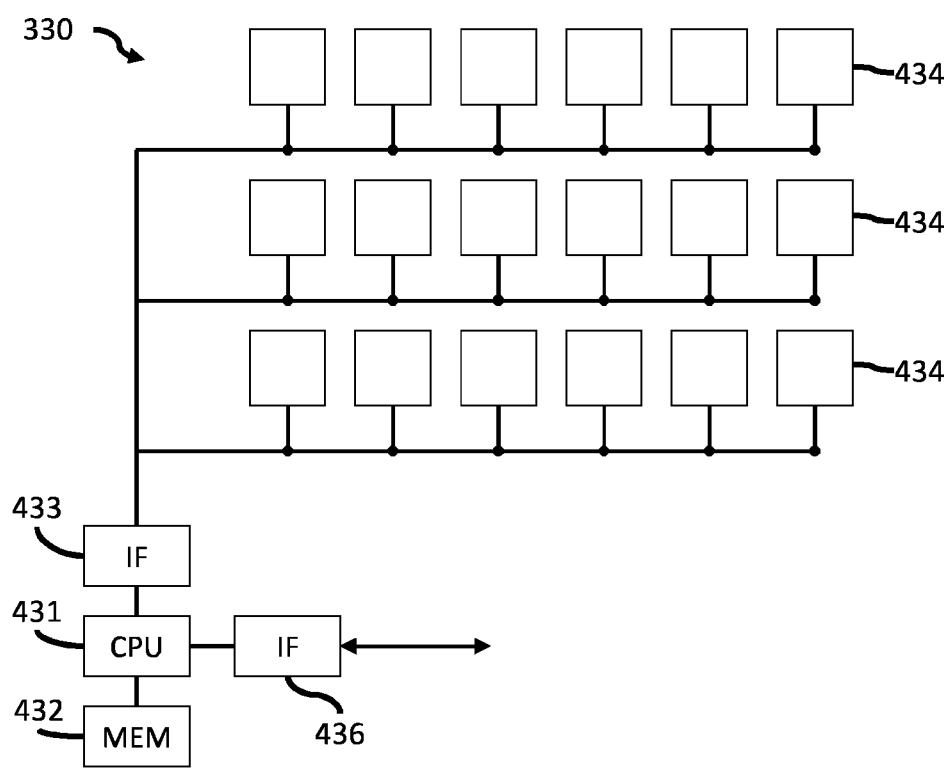
FIG. 4 schematically illustrates details of the CED according to various examples.

FIG. 4 illustrates aspects in connection with the CED 330. The CED 330 includes a phased array of antenna elements (or, simply, antennas) 434 that impose a configurable phase shift when reflecting incident signals. This defines respective spatial filters that may be associated with spatial directions into which the incident signals are reflected. The antennas 434 can be passive or semi-passive elements. The CED 330 thus provides coverage extension by reflection of radio-frequency (RF) signals. A translation to the baseband may not be required. This is different to, e.g., decode-and-forward repeater or regenerative functionality. The antennas 434 may induce an amplitude shift by attenuation. In some examples, the antennas 434 may provide forward amplification with or without translation of signals transmitted on the radio link to the baseband. In some examples, the CEDs may be configurable to shift power from one polarization to the orthogonal polarization. The antennas 434 may amplify and forward the signals.

The CED 330 includes an antenna interface 433 which controls an array of antennas 434; a processor 431 can activate respective spatial filters one after another. For instance, SDT or MDT spatial filters may be activated. For instance, only SDT spatial filters may be used, where MDT is not activated. It would also be possible to activate MDT and SDT spatial filters alternatingly.

The CED 330 further includes an interface 436 for receiving and/or transmitting signals on an auxiliary link (cf. FIG. 2; interfaces 215, 225). The interface 436 may be a wireless interface. In some examples, the auxiliary link may be replaced with a wired auxiliary channel and the interface 436 may be a wired interface. There is a memory 432 and the processor 431 can load program code from the non-volatile memory and execute the program code. Executing the program code causes the processor to perform techniques as described herein.

FIG. 4 is only one example implementation of a CED. Other implementations are conceivable. For example, a meta-material surface may be used. The meta-material can have a configurable refraction index. The meta-material may be made of repetitive tunable structures that have extensions smaller than the wavelength of the incident RF signals; for the sake of simplicity, such structures are also referred to as antenna elements.

Figure 5:
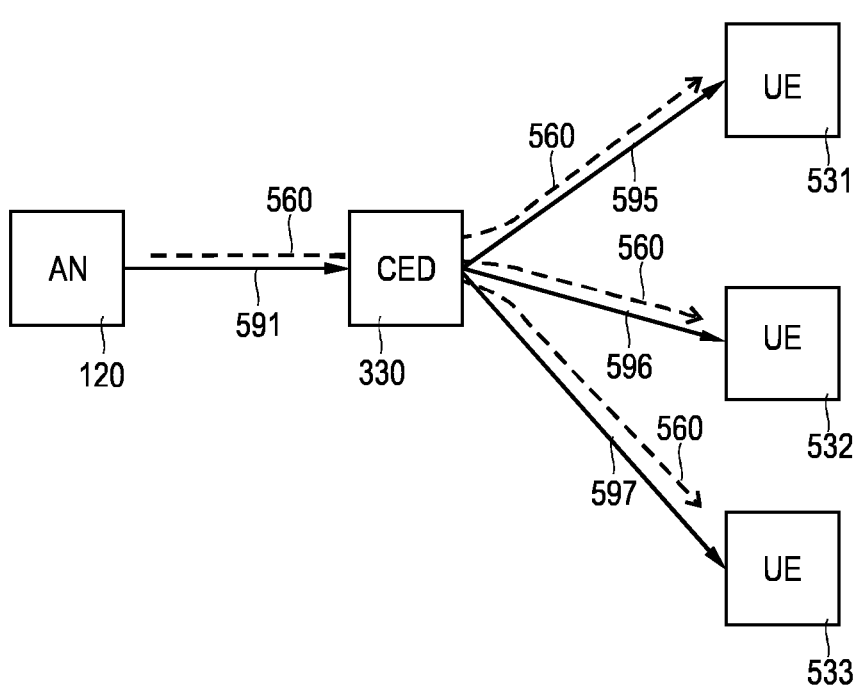
FIG. 5 schematically illustrates a SIMO MDT according to various examples.

FIG. 5 illustrates aspects with respect to communication between an AN 120 and multiple UEs 531-533. The communication is implemented via a CED 330. FIG. 5 illustrates aspects with respect to a SIMO MDT. I.e., a single data stream 560 provided by the AN 120 is provided to all UEs 531-533. This is achieved by configuring the CED 330 to provide an MDT spatial filter that is associated with a single input spatial direction—defining the spatial propagation path 591 between the AN 120 and the CED 330—and further associated with multiple output spatial directions—defining the spatial propagation paths 595, 596, 597 from the CED 330 to each one of the UEs 531-533, respectively.

Figure 6A:
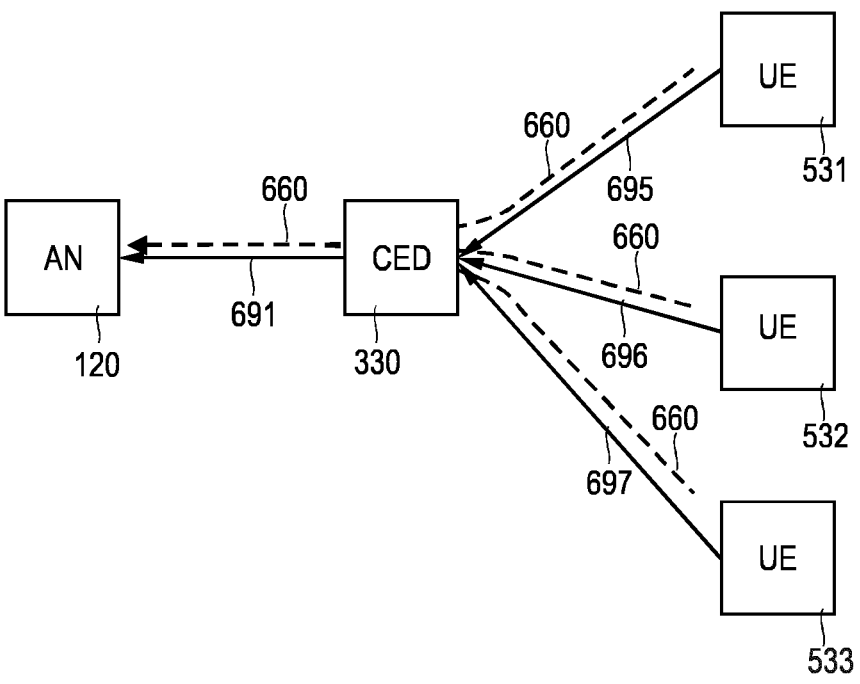
FIG. 6A schematically illustrates a MISO MDT according to various examples.

FIG. 6A illustrates aspects with respect to communication between the AN 120 and multiple UEs 531-533. The communication is implemented via the CED 330. FIG. 6A illustrates aspects with respect to MISO MDT. I.e., a data stream 660 is obtained by fusing respective parts provided by each one of the UE 531-533. For instance, the UEs 531-533 could communicate using TDM, without a need of the CED 330 to reconfigure the spatial filter each time the TDM switches from one of the UEs 531-533 to the next UE 531-533.

Figure 6B:
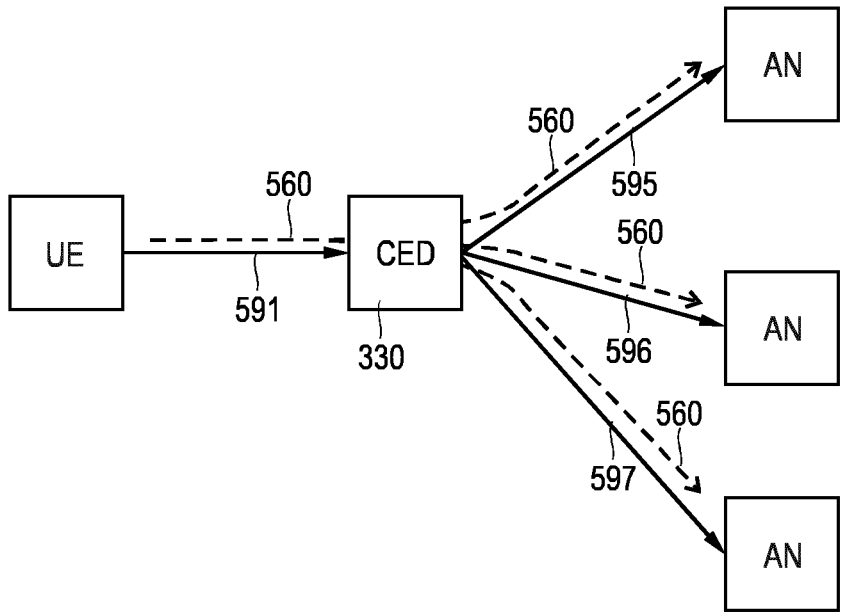
FIG. 6B schematically illustrates a SIMO MDT according to various examples.
Figure 6C:
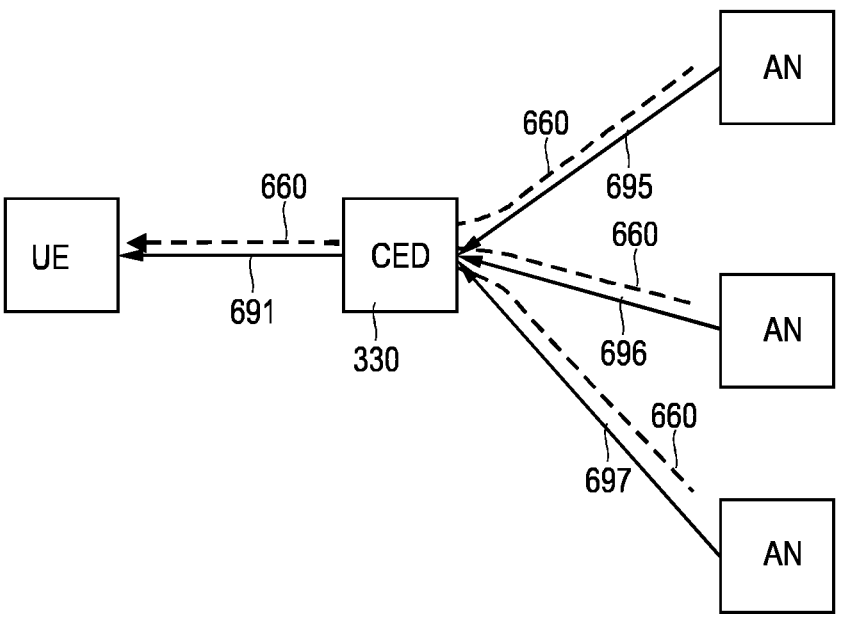
FIG. 6C schematically illustrates a MISO MDT according to various examples.

FIG. 5 and FIG. 6A are only examples. Further examples are conceivable. For instance, another possibility would be that UEs 531-533 transmit the same data stream. The data streams transmitted by UEs 531-533 are then fused by CED 330 and forwarded to the AN 120. In this way, an UL signal stronger with respect to SDT may be obtained. A further possibility would be that a single UE transmits signals that are output into multiple output spatial directions towards multiple access nodes (cf. FIG. 6B); this corresponds to uplink SIMO MDT. Yet a further possibility would be that multiple access nodes transmit signals towards the CED;

these signals can then be fused by the CED and forwarded to a given UE (cf. FIG. 6C); this corresponds to downlink MISO MDT. As a general rule, the techniques disclosed herein can be applied to all such scenarios. Typically, the CED operation is agnostic to the specific type of scenario.

Figure 7:
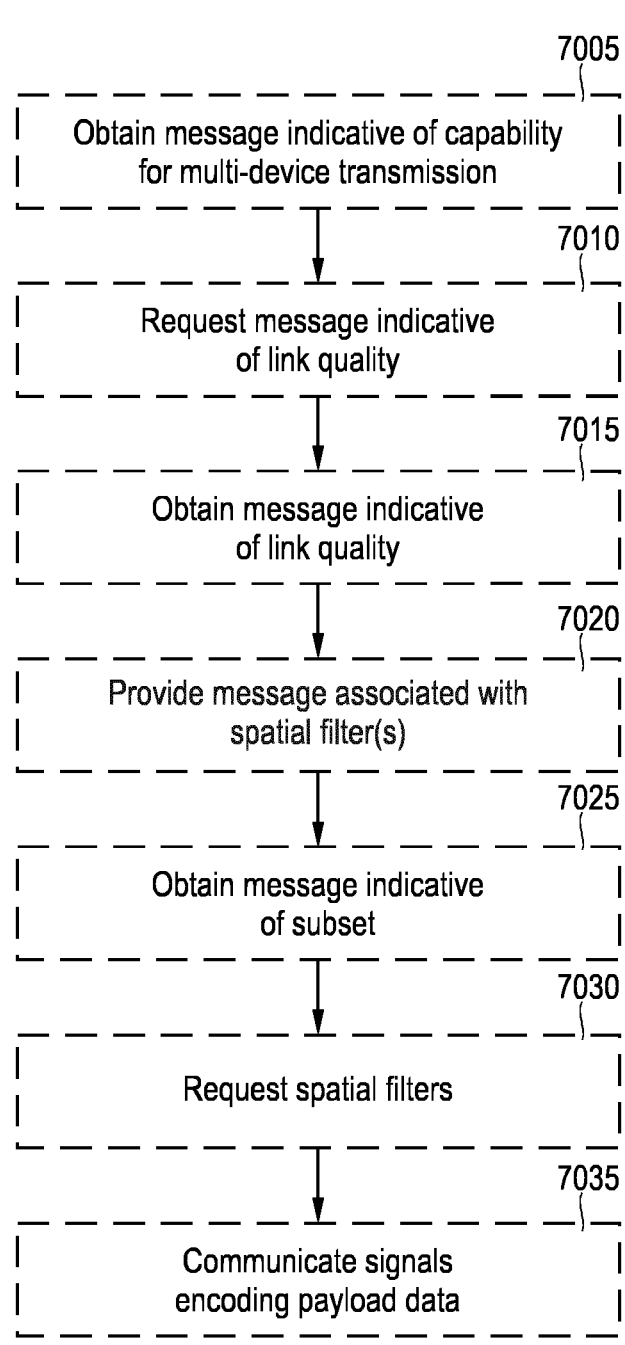
FIG. 7 is a flowchart of a method according to various examples.

FIG. 7 is a flowchart of a method according to various examples. For instance, the method of FIG. 7 may be executed by a node of a communication system. For instance, the method of FIG. 7 could be executed by an AN, e.g., by the AN 120 (cf. FIG. 1 and FIG. 2). For instance, the method of FIG. 7 could be executed by the processor 221 of the AN 120, upon loading program code from the memory 222 and upon executing the program code. FIG. 7, for the sake of simplicity, will be explained in connection with a scenario where the method is implemented by an AN, but other implementation scenarios are possible (generally, the method of FIG. 7 can be executed by a first CN that communicates with multiple second CNs via a CED).

The method of FIG. 7 is concerned with activating and configuring an MDT for multiple different UEs arranged at different locations in the surrounding of the CED.

Optional boxes are labeled with dashed lines.

At optional box 7005, a message is obtained that is indicative of a capability of a CED to transmit incident signals received along one or more input spatial directions into one or more output spatial directions such that a count of the one or more input spatial directions is different than the count of the one or more output spatial directions. In other words, at box 7005, the capability of the CED to support an MDT is indicated. For instance, the CED could indicate whether it has available spatial filters that are suitable for supporting the MDT. For instance, the CED could indicate whether it can support MISO MDT and/or SIMO MDT. The CED could indicate the spatial directions supported for MDT. The CED could indicate a count of MDT spatial filters. MDT spatial filters provide N input spatial directions and M output spatial directions, wherein N≈M.

Generally, such message may be obtained from the CED, e.g., using an auxiliary link, e.g., as explained in connection with FIG. 2. In another scenario, such message may also be obtained from a control node that controls the operation of the CED.

In another scenario it would be possible to have pre-defined knowledge regarding the capability of the CED to transmit incident signals received along one or more input spatial directions into one or more output spatial directions such that the count of the one or more input spatial directions is different than the count of the one or more output spatial directions. For instance, there could be a fixed registry at the participating communication nodes regarding the capability. In such a scenario, it is not required to rely on the message at box 7005.

Next, at box 7010, a message indicative of a link quality may be requested. For instance, a request message may be provided to the CED or the associated control node to provide a message that is indicative of the link quality. For instance, the AN 110 can request information from the CED of relative link qualities of MDT spatial filters, e.g., with respect to each other or with respect to SDT.

Such request may be accompanied by, e.g., a message that is indicative of measured link qualities of multiple UEs that are potentially being served using MDT. These link qualities can pertain to the current coverage scenario, which may be without MDT (i.e., using SDT) or another configuration of a MDT, i.e., using different spatial filters at the CED. Thereby, based on the measured link qualities, a prediction may be possible, e.g., in absolute terms, of the expected link quality at the second communication devices, once the CED is (re-)configured to provide the MDT.

Alternatively or additionally, it would also be possible to provide a message that is indicative of a required link quality associated with the one or more output spatial directions or the one or more input spatial directions. I.e., it would be possible to specify a certain minimum link quality for the MDT. For instance, such a scenario may facilitate autonomous activation of an MDT spatial filter at the CED, as long as such constraint is fulfilled.

Then, a message may be obtained at box 7015. The message obtained at box 7015 is indicative of a link quality associated with one or more output spatial directions or one or more input spatial directions of one or more spatial filters providing MDT.

For instance, a minimum link quality of different ones of the one or more output spatial directions of the one or more input spatial directions could be indicated, i.e., a worst-case link quality across the directions supported by the respective MDT spatial filters. It would be possible to provide an indication of the relative link quality, i.e., of different output spatial directions or different input spatial directions associated with different MDT spatial filters. Such relative link quality could be with respect to each other, e.g., $|h_1|^2/|h_2|^2$ pertaining to a gain imbalance. Such relative link quality could also be with respect to the SDT scenario, e.g., $|h_1|^2$ or $|h_2|^2$.

Based on such information, a determination or specifically a selection of the appropriate MDT spatial filter or filters is facilitated. It would be possible to decide whether to activate MDT and/or SDT. Based on such information, it would be possible to determine a power distribution between multiple output spatial directions (or between multiple input spatial directions for MISO MDT), so that based on the power distribution the appropriate MDT spatial filter can be determined.

For instance, it would be possible that the AN performs a pre-selection of certain spatial filters based on the message indicative of the link quality. Then, the AN may provide a message that is associated with one or more MDT spatial filters, box 7020. For instance, the message may be indicative of a set of input spatial directions or a set of output spatial directions. For example, the AN could indicate directions of UEs that can be served using the MDT. The AN could indicate candidate spatial filters, i.e., candidates for subsequent activation. The AN could also indicate the directions. The AN could indicate a power distribution between multiple output spatial directions (cf. TAB. 2: example VI); then the CED can calculate the phase weights using an appropriate predefined ruleset.

In some scenarios, instead of determining the appropriate MDT spatial filter directly (and indicating the spatial filter in the message at box 7020), a determination of a power distribution between multiple output directions could be facilitated. In other words, a 2-step determination process may be implemented, first selecting the power distribution and secondly determining the appropriate MDT spatial filter. This facilitates particularly low control-signaling overhead, because it may be sufficient to signal, to the CED, the power distribution to put the CED into a position that it can perform an ad-hoc calculation of the phase shifts for its antenna elements.

It is not required in all scenarios that such set of input spatial directions and/or the set of output spatial directions and/or the power distribution is determined (only) based on information regarding the link quality. For instance, alternatively or additionally to such decision criterion based on the link quality, it would be possible to consider services provided to the multiple UEs. For instance, it could be judged whether a broadcast or multi-cast communication is possible or whether multiple UEs can be served using TDM. Then, for MDT-eligible UEs, respective input spatial directions or output spatial directions may be included in the set and provided to the CED. This could be based on position estimations of the UEs. For instance, high-priority services may be associated with a higher estimated received power, thus affecting the power distribution accordingly. For instance, depending on quality-of-service requirements of the services, the power distribution could be determined.

At box 7025, it is then optionally possible that a message indicative of one or more subsets of the set of input spatial directions of the set of output spatial directions is obtained, e.g., from the CED. Here, where the AN requests certain input spatial directions or output spatial directions to be jointly served using MDT, the CED can respond with a subset which it can support, e.g., based on certain predefined constraints such as a minimum required link quality, hardware constraints, the power distribution requested in message 7020, etc.

Then, at box 7030, the CED can be requested to apply one or more spatial filters that are selected according to the set of input spatial directions of the set of output spatial directions of the one or more subsets. Other selection criteria would be possible. For instance, the node may judge whether an MDT is indeed favorable, e.g., given predicted link qualities, predicted data throughputs, and/or other constraints.

At box 7035, it is then possible to communicate, between the AN and the CED and on the radio link, one or more signals that encode payload data. These one or more signals are associated with the one or more MDT spatial filters. I.e., such signals belong to a single data stream which is bonded or branched by the CED. Uplink signals and/or DL signals may be communicated. By using one or more input spatial directions or one or more output spatial directions, multiple different CNs can be jointly served.

Figure 8:
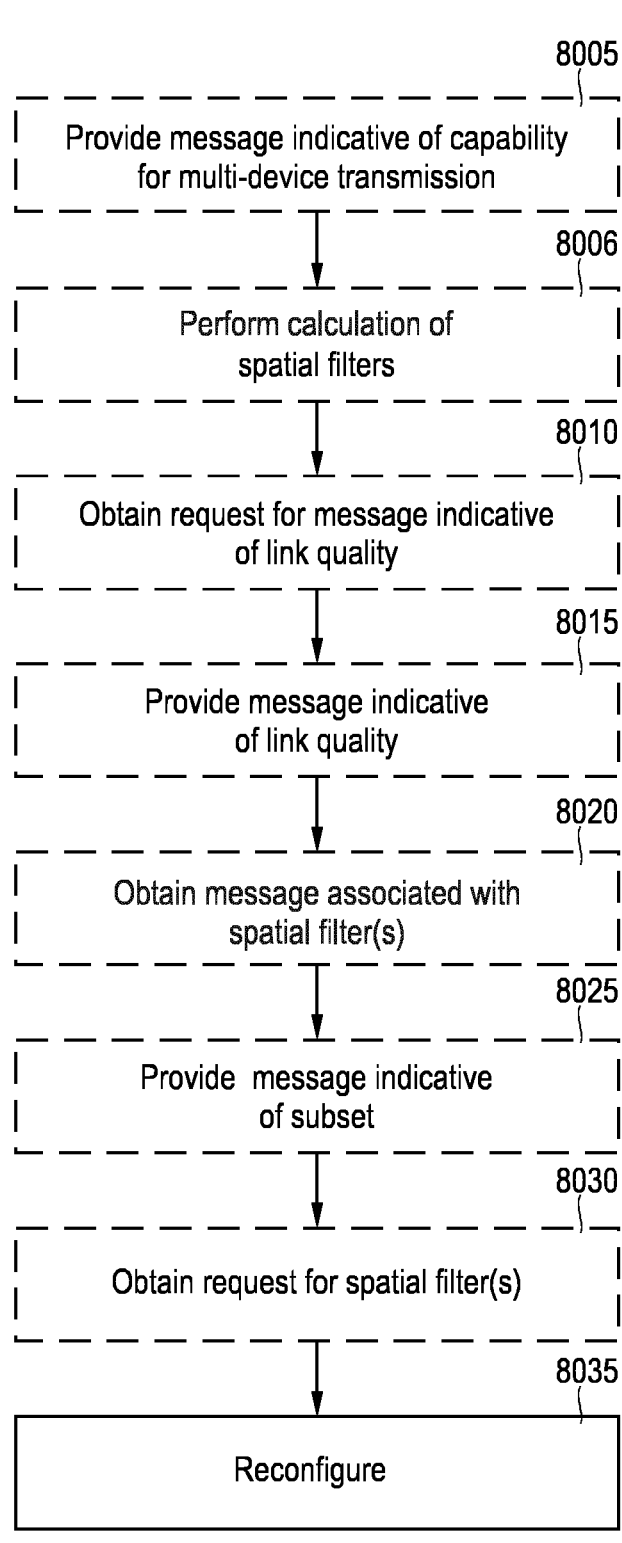
FIG. 8 is a flowchart of a method according to various examples.

FIG. 8 is a flowchart of a method according to various examples. For instance, the method of FIG. 8 may be executed by a CED. For instance, the method of FIG. 8 could be executed by the processor 431 of the CED 330 according to the example of FIG. 4, e.g., upon loading and executing program code stored in the memory 432.

The method of FIG. 8 is concerned with activating and configuring an MDT for multiple different UEs arranged at different locations in the surrounding of the CED.

Optional boxes are labeled with dashed lines.

The method of FIG. 8 is inter-related with the method of FIG. 7.

At box 8005, a message is optionally provided that is indicative of a capability of the CED to transmit incident signals received along one or more input spatial directions or one or more output spatial directions such that a count of the one or more input spatial directions is different than the count of the one or more output spatial directions. In other words, at box 8005, the capability of the CED to support an MDT is indicated. The capability could also be pre-indicated; so that the message at box 8005 is not required.

Box 8005 corresponds to box 7005.

It would be optionally possible, at box 8006, to perform a calculation, e.g., an optimization of a configuration of spatial filters, e.g., the settings (e.g., phase shift and/or amplitude damping or amplification) of each unit cell of a reflective surface. I.e., as part of the calculation, the individual setting of each unit cell of a reflective surface of the CED can be determined. For instance, an iterative numerical optimization could be implemented that minimizes or maximizes a goal function. Different optimization criteria have been discussed in connection with TAB. 2.

It is not required in all scenarios that an optimization is performed during operation of the CED. It would be possible that multiple spatial filters supporting MDT are predefined. A respective look-up table could be provided.

At box 8010 (inter-related with box 7010), a message indicative of a link quality may be requested. A respective request message may be obtained, e.g., from an AN. The request message can thus trigger providing a message indicative of a link quality of serving multiple devices using a MDT, at box 8015 (inter-related with box 7015). This can be a predicted link quality, serving as a decision basis for activating one or more specific spatial filters.

A request according to box 8010 may be accompanied by, e.g., a message that is indicative of measured link qualities of multiple communication devices that are currently being served using SDT and that are potentially being served using an MDT. Such information may correlate with headroom available for signal loss at the CED when activating the MDT.

Alternatively or additionally, it would also be possible to obtain a message that is indicative of required link quality associated with one or more spatial output directions or one or more input spatial directions. I.e., it would be possible to specify a certain minimum link quality to be met when communicating in accordance with an MDT.

At box 8015, the message indicative of a link quality associated with the one or more output spatial directions or one or more input spatial directions is provided. For instance, such information may be determined based on predetermined data stored in a lookup table and associated with the various spatial filters used for an MDT. Respective data may be obtained from a calculation that may be performed at box 8006 or has been pre-performed. For instance, such data may specify the signal gain as discussed in connection with TAB. 2 ($|h_i|^2$ for each input or output direction and possibly for multiple different MDT spatial filters, e.g., obtained for different optimization criteria, or a minimum link quality, i.e., the worst-case link quality). Link qualities could be indicated in relative terms, e.g., a worsening with respect to the SDT case. For instance, the signal gain could be specified for each one of the multiple devices. At box 8020 (inter-related with box 7020), it is possible to obtain a message that is associated with one or more spatial filters. For instance, the message could be indicative of a set of input spatial directions or a set of output spatial directions. This would mean that a preselection of certain input spatial directions or output spatial directions could be made by, e.g., the AN. This preselection could be based on certain constraints of communication between the AN and UEs and/or could also be based on the message provided at box 8015 and/or could be based on UE locations. The message could be indicative of a power distribution between output signals reflected along different ones of multiple output spatial directions. For instance, the message could include a data element that includes a value defining the power distribution. The message could, for example, selectively include such data element, wherein absence of the respective data element in the message would then indicate a default value of the power distribution, e.g., 50%:50%.

In some scenarios, the message could be indicative of, both, the power distribution, as well as the multiple output spatial directions. For instance, multiple respective data elements may be included in a payload section of the message.

Where the message is indicative of multiple output spatial directions, this could be implemented using a pointer to a predefined setting of the multiple output spatial directions. For instance, beam identities of respective output beams could be identified. They could be candidate settings for the multiple output spatial directions and respective indices may be used to select one of the candidate settings.

Based on such message obtained at box 8020, various actions can be taken.

For instance, a given spatial filter could be selected. A respective spatial filter may be determined or calculated. A fine selection can be made and a message indicative of a subset of input or output spatial directions, selected from the set of input or output spatial directions, could be provided to the AN in a respective message at box 8025 (inter-related with box 7025). For example, such fine selection could be based on certain operational constraints of the CED. For instance, such fine selection could be based on estimates of the link quality, e.g., in case the message indicative of the link quality is not provided to the AN at box 8015, but in case a respective estimation is locally implemented at the CED. Box 8025 corresponds to box 7025.

Next, at box 8030 (inter-related with box 7030), a request for one or more MDT spatial filters to be activated by the CED is received from the AN. A timing to activate multiple MDT spatial filters could be requested.

While in the scenario of FIG. 8 a separate request for one or more MDT spatial filters is obtained at box 8030, accord-ing to some examples, such request may also be—either explicitly or implicitly—included in message 8020. Here, upon, e.g., providing the message that is indicative of a power distribution, it would be possible that the CED directly proceeds to configuring antenna elements to apply the phase shifts that reflect the incident signals into multiple output spatial directions in accordance with the requested power distribution.

Then, at box 8035, the CED is reconfigured in accordance with the request of box 8030. This facilitates communication of signals encoding payload data on the radio link between the AN and multiple devices, using the MDT (cf. box 7035).

With respect to FIG. 7 and FIG. 8 the following is noted: the flowcharts are for illustrative purpose. According to examples, the order of the boxes can be changed. Also, some boxes may be omitted and/or combined with each other. For instance, it would be possible that box 7010 is executed before box 7005 and/or that box 7005 and box 7015 are combined: a minimum required link quality may be signaled to the CED which may then respond with multiple MDT spatial filters that meet these requirements, hence implicitly indicating its capability to support the MDT. In some examples, the calculation of one or more spatial filters at box 8006 could be based on the message obtained at box 8020. For instance, the calculation at box 8006 could be based on a power distribution indicated by the message obtained at box 8020; i.e., box 8006 could be executed after box 8020.

Some variations that are available and further options will become apparent from the discussion of examples provided below in connection with TAB. 3. These examples pertain to implementations of the methods according to FIG. 7 and FIG. 8.

TABLE 3

| | | |
|---|---|---|
| Various examples for control signaling to activate an MDT and select appropriate MDT spatial filters. | | |
| | Brief description | Example Details |
| I | Full list of link qualities | Here, CED provides, to the AN, a message that is indicative of its capability to support MDT using appropriate spatial filters. See box 7005 and box 8005. This message or a further message can also be indicative of the quality of the beam splitting or beam fusion. See box 7015 and 8015. |
| | | For instance, a matrix can be provided to the AN that has K rows and K columns. The matrix entry at row k and column k' is a tuple (a, b) where a and b means: if two UEs, served individually using SDT by output spatial directions k and k', respectively, are served using an MDT spatial filter that provides the same output spatial directions simultaneously, then the received power at the UE in the output spatial direction k is $aI_k$ and the received power at the other UE in the output spatial direction k' is $bI_{k'}$, where $I_k$, $I_{k'}$ are the received power at the UE in the output spatial direction k and the received power at the UE in the output spatial direction k', respectively, when served individually using SDT. I.e., a relative link quality of MDT with respect to SDT is indicated. This matrix can be an upper (or lower) diagonal matrix with blank main diagonal. Further, if the CED has implemented several sets of spatial filters serving similar spatial directions-e.g., obtained through different types of optimizations according to TAB. 2-then several such lists can be transferred (one per optimization method). |
| | | Such one or more lists can be communicated in boxes 7015 and 8015 in FIGS. 7 and 8. They may or may not be provided upon request of the AN. |

TABLE 3-continued

Various examples for control signaling to activate an MDT and select appropriate
MDT spatial filters.

| | Brief description | Example Details |
|---|---|---|
| | | A potential drawback of this example is that each list may be of a large size. Consider for example a CED with 100 spatial filters for MDT, each spatial filter capable of serving three spatial input/output directions simultaneously and optimized in 10 different ways per spatial input/output direction. In said case, the list contains $$10\binom{100}{3} = 1617000 \text{ entries,}$$ each one containing 3 numbers. (Notation $\binom{100}{3}$ means "100 choose 3", i.e., the number of ways in which 3 objects can be selected from a list of 100 possibilities.) |
| II | Worst-case link quality | Rather than providing the full list or lists of MDT spatial filters or spatial input/output directions (as in example I), it would be possible that the CED provides, to the AN, a minimum link quality. This could be provided in relative terms, e.g., with respect to the SDT on the same spatial input/output directions. Such information could be communicated in box 7015 and box 8015 of the methods of FIGs. 7 and 8. |
| III | Selection of set of spatial filters | Here, the AN can request the link quality-e.g., the relative strengths-of spatial filters that serve certain spatial input/output directions. The CED can then respond with certain available options. This could be implemented by messages according to box 7020 and 8020 in combination with boxes 7010 and 8010. For example, the AN can indicate certain spatial input or output directions that are candidates for the MDT and request respective link qualities. Then, the CED may respond with a message according to box 7015 and box 8015 for the matching spatial filter(s). This is illustrated for a concrete example: the AN is currently serving three UEs A, B, C via CED spatial filters #1, #15, and #27 in a TDM fashion (single-device transmission; i.e., the CED reconfigures between these spatial filters each time the AN serves another one of the UEs). The AN is aware of the Reference Signal Received Power (RSRP) values to said three UEs A, B and C, say R1, R2, and R3. The AN requests information from the CED of relative possible strengths if the three UEs A, B, C were served using the MDT, e.g., using broadcast (cf. box 7010/8010 and box 7020/8020). The CED responds with the list (cf. box 7015/8015) $$\left\{ \begin{array}{l} 0.2, 0.2, 0.2 \\ 0.5, 0.25, 0.1 \\ 0.8, 0.15, 0.1 \\ 0.6, 0.3, 0.1 \end{array} \right\}$$ This indicates that new RSRPs, with the MDT, is one of the rows from the list $$\left\{ \begin{array}{l} 0.2R_1, 0.2R_2, 0.2R_3 \\ 0.5R_1, 0.25R_2, 0.1R_3 \\ 0.8R_1, 0.15R_2, 0.1R_3 \\ 0.6R_1, 0.3R_2, 0.1R_3 \end{array} \right\}$$ where the first value in each row corresponds to the RSRP of UE A, etc. Each row corresponds to a respective MDT spatial filter (all serving similar spatial directions using a different configuration of the unit cells of the reflective surface of the CED). The AN can now select one of these choices-i.e., select a specific MDT spatial filter-and indicate to the CED to apply the corresponding MDT spatial filter (box 7030/8030). |

TABLE 3-continued

Various examples for control signaling to activate an MDT and select appropriate
MDT spatial filters.

| | Brief description | Example Details |
|---|---|---|
| | | A potential drawback of such implementation is that if there are many UEs to be simultaneously served, say, 40, then such signaling may become inefficient, as the BS requests many lists, namely $$\binom{40}{3} = 9880.$$ |
| IV | Selection of set and subset of spatial filters | To avoid signaling extensive information-e.g., as explained in scenario III-the CED may restrict the information to a subset (cf. box 7025/8025). I.e., the CED may discard certain MDT spatial filters that do not fulfil certain requirements and not signal respective link qualities to the AN. For instance, firstly, the AN provides, to the CED, the list of spatial input or output directions which covers the UEs that should be served in the MDT (cf. box 7020/8020). For example, the AN can provide respective IDs of the SDT spatial filters currently used to serve these UEs. The AN, secondly, provides to the CED a list of current RSRP values for these UEs, e.g., measured link qualities based on UE reporting or local measurement (cf. box 7010/8010). Measurements based on UL and/or DL reference signals can be used. The AN, thirdly, provides to the CED a quality indicator. This could be the minimum accepted RSRP value across all UEs, or a required RSRP value for a particular one of the UEs. The CED then selects appropriate spatial filters-e.g., by executing one or more optimizations (box 8006) to cover all these UEs, and responds with, at least, one option to split the beams (cf. box 7025/8025), i.e., at least one MDT spatial filter. Assume 100 SDT spatial filters at the CED; and 6 UEs located in spatial output directions associated with the SDT spatial filters #10,#20,#30,#40,#50, and #60, respectively. The AN sends the indices (10, 20, 30, 40, 50, 60) and RSRP values for the UEs, say, (5, 4, 6, 3, 8, 9). The AN indicates that the minimum accepted RSRP after beam splitting is 2.8. The CED, which knows its own MDT capability, proposes a subset of MDT spatial filters according to (10, 50, 60), (20, 30), and (40). The minimum RSRP of 2.8 is then met. The AN activates MDT and thus broadcasts its information repeated over three time units. In the first unit, the CED splits the data stream towards output (10, 50, 60), using a respective MDT spatial filter; in the second time unit the CED splits the data stream towards output spatial directions associated with the SDT spatial filters (20, 30), using a respective MDT spatial filter; and in the third time unit the SDT spatial filter having index 40 is activated. This represents a paradigm shift with respect to a traditional AN-CED interface. Rather than the AN gaining detailed information about the CED, such as available spatial filters for multi-beam transmission, the AN requests a service from the CED and the CED controls the spatial filters for MDT locally. |
| V | Selection of power distribution | To avoid extensive signaling, it would be possible to not select the specific spatial filter at a node controlling the CED; but rather implement the determination (e.g., a calculation or selection from a pre-populated codebook) of the specific spatial filter at the CED based on one or more constraints provided to the CED. For instance, the power distribution between multiple output spatial directions could be one of such constraints. Then, it can be sufficient to signal the power distribution and the respective output spatial directions, without a need to provide respective information on the concrete spatial filter that is subsequently activated at the CED. |

Next, further details with respect to TAB. 3: scenario V will be explained.

This scenario is based on the finding that a codebook construction—e.g., according to TAB. 2: examples I-V, e.g., to facilitate scenarios as discussed in TAB. 3 I-IV—involves solving nonconvex optimization problems, which may sometimes not be feasible for real-time implementations; this means that such calculation of phase shifts for the antenna elements can be pre-executed and there may be a need to share extensive information between the CED and the CN. The amount of signaling that needs to be exchanged between a CN and the CED is high in other scenarios such as TAB. 3: example III or example IV. This is because some of these variants include transmitting a table including the exact power distributions for all possible angular setups.

According to TAB. 3: section V, the appropriate MDT spatial filter can be determined or is selected based on the power distribution. Upon the CED obtaining the message that is indicative of the power distribution, the CED can execute a predefined ruleset to determine the phase shifts to be applied of the various antenna elements. Such techniques are based on the finding that according to various examples, it is possible to calculate the spatial filter, i.e., calculate the phase shifts, to meet a certain power distribution requirement. Specifically, the spatial filter for various angular setups, e.g., various output spatial directions in various input spatial directions, can be calculated to meet the power distribution requirement.

This corresponds to an "online" or "ad hoc" calculation of the MDT spatial filter. It is not required to populate a large It is possible that the participating nodes agree on the particular predefined ruleset to be employed for calculating the phase shifts.

The predefined ruleset can include a continuous functional dependency of the phase shifts on one or more input variables. Executing the predefined ruleset can then include calculating the phase shifts—constituting the spatial filter— using a value associated with the power distribution as an input variable of the continuous functional dependency. I.e., a feed-forward calculation can be implemented (distinct from an iterative numerical optimization that seeks to minimize or maximize a certain target function). This greatly reduces the requirement of processing power to determine a spatial filter compared to optimization techniques.

Multiple techniques of calculating the MDT spatial filter will be disclosed. Some techniques are summarized in TAB. 4 below.

TABLE 4

Calculation techniques for calculating MDT spatial filters. This corresponds to designing a phase shift per CED antenna element. The examples of TAB. 4 can be combined with each other. The calculation is based on a limited set of parameters, in some scenarios restricted to the power distribution and the output spatial directions.

| | Calculation technique | Example description |
|---|---|---|
| I | Combination of beamforming vectors | In this example, beamforming vectors that are associated with the various output spatial directions - e.g., with respect to a common input spatial direction - can be combined with each other. For instance, an element-wise normalized sum of complex conjugates of the beamforming vectors can implement the combination. It would also be possible that the combination is implemented by a geometrical mean of the elements of the steering vectors along a unit circle in complex plane (i.e., a geodesic mean). A weighted combination could be implemented and weights can be set in accordance with the power distribution. For instance, if a first output spatial direction is to obtain a larger fraction of the output power, then a corresponding weight associated with the beamforming vector of this output spatial direction can be set to a larger value compared to other weights of the beamforming vectors of other output spatial directions that are to obtain a smaller fraction of the output power. |
| II | Partitioning of antenna elements | In this example, it is possible to determine fractions of antenna elements in accordance with the power distribution. Then, a first fraction may jointly serve multiple output directions while a second fraction may exclusively serve a single output direction. Thereby, by tailoring the size of the various fractions, the power distribution can be set to meet arbitrary constraints. | codebook of MDT spatial filters. Consider a scenario where an access node serves two UEs via a CED. Thus, two SDT spatial filters—i.e., corresponding phase shifts supplied by the antenna elements of the CED—used to serially reflect incident signals into multiple output spatial directions directed towards the 2 UEs are available at the CED. Then, it would be possible that the phase shifts for a corresponding MDT spatial filter is calculated based on the SDT spatial filters. For instance, the SDT spatial filters can be represented in the form of a beamforming vector, e.g., a beam steering vector, and then a weighted combination of these vectors can be implemented. It has been empirically found that such combination can yield high-performance results for the corresponding MDT spatial filter.

Such calculation can be formally captured by a respective predefined ruleset defining how to implement the calculation of the phase shifts applied by each antenna element.

First, an example technique according to TAB. 4: only example I is described.

In the following description, $s(\theta_{o1}) \in \mathcal{C}^{N \times 1}$ and $s(\theta_{o2}) \in \mathcal{C}^{N \times 1}$ denote the steering vectors—as an example of beamforming vectors—corresponding to the two output directions, including the steering vector from the input direction to the CED, where N denotes the number of elements on the CED. One can form the beam steering vector to support the two output directions as shown below in Eq. 1, defining a respective predefined ruleset:

$$C(\theta_{o1}, \theta_{o2}) = \frac{s * (\theta_{o1}) + s * (\theta_{o2})}{|s * (\theta_{o1}) + s * (\theta_{o2})|} \tag{1}$$

where $C(\theta_{o1}, \theta_{o2})$ is a vector whose entries correspond to the aforementioned CED antenna phase changes, absolute value

|·| and division should be interpreted as being elementwise, and "*" is complex conjugation. I.e., $C(\theta_{o1}, \theta_{o2})$ defines the MDT spatial filter. Eq. 1 thus describes an elementwise normalized sum of complex conjugates of the steering vectors.

While Eq. 1 is defined for two outgoing spatial directions, Eq. 1 can be readily extended to a larger number of outgoing spatial directions by extending the sums in the denominator and numerator accordingly.

As a general rule, a steering vector represents the set of phase delays a plane wave experiences, evaluated at a set of antenna elements. The phases are specified with respect to an arbitrary origin, e.g., the transmitter CN.

A plane wave $$\propto e^{-j\frac{2\pi}{\lambda}\langle \hat{k}, \vec{r}\rangle}$$

travelling along direction $\hat{k}$ would impress a definite set of phase differences on a set of antenna elements (up to aliasing), which uniquely defines a steering vector $s(\hat{k}) \in \mathbb{C}^{N \times 1}$.

This means that a combination of two SISO spatial filters in the manner described in Eq. 1 can yield an MDT spatial filter, specifically a SIMO MDT.

The spatial filter defined by Eq. 1 provides for a 50%:50% power distribution (P=1)

Figure 9:
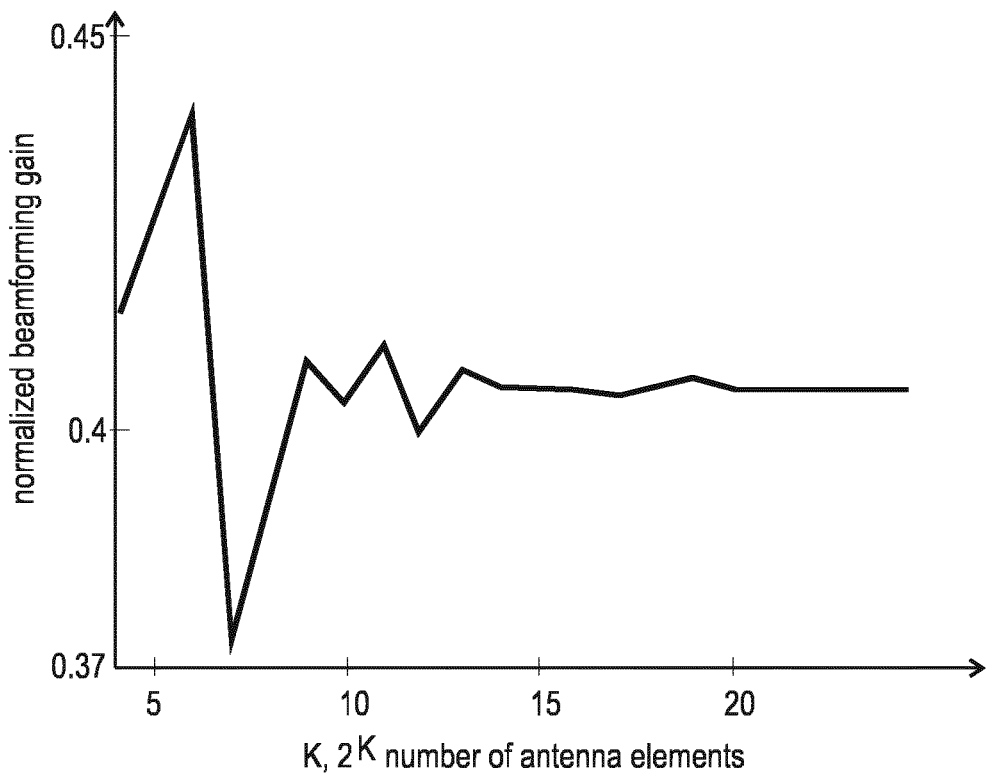
FIG. 9 schematically illustrates a performance of MDT spatial filters determined in accordance with a certain predefined ruleset according to various examples.

Before moving on to cases where unequal power distributions are sought, the performance of the construction of the MDT spatial filter using the predefined ruleset defined by Eq. 1 is evaluated in connection with FIG. 9.

FIG. 9 shows the normalized beamforming gain that can be obtained in each of the two output spatial directions. Using $C(\theta_{o1}, \theta_{o2})$ according to Eq. 1, one can compute the normalized beamforming gain that can be obtained in, say, output spatial direction $\theta_{o1}$ as $$s^T(\theta_{o1})C(\theta_{o1},\theta_{o2})/N^2.$$

As can be seen, as the number of antenna elements increases, the normalized beamforming gain approaches a limit, and this limit can easily be determined numerically and analytically (not shown here) to be $4/\pi^2 \approx 0.4053$ (for $N \to \infty$, or at least growing large).

The meaning of this number is that 40.53% of the energy that could be reflected to a first UE of two UEs if that first UE was the only UE to be served, will be reflected to the first UE when there is the SIMO MDT spatial filter calculated according to Eq. 1 will be used (and similarly for the second UE of the two UEs). The remaining 100%2×40,53%=19% will be lost, as the effective array gain decrease. These facts hold as the number of antenna elements N grows large and the two UEs are not in the same direction. This is a good result compared to a reference scenario where half of the antenna elements would be allocated to output towards the first UE and the other half of the antenna elements would be allocated to output towards the second UE: For such reference scenario, each one of the first UE and the second UE is served with a beamforming gain of only 0.25, so that 50% of the potential array gain is lost, due to a smaller effective area associated with each receiver.

Next, unequal power distributions are considered, i.e., ≠1. Suppose that it is desired that a higher power is output in a first direction towards a first UE of two UEs compared to a second direction towards a second UE of the two UEs. In such a scenario—combining examples I and II of TAB. 4—it is possible to restrict a fraction d of the antenna elements to exclusively serve the first UE, while the remaining/complementary fraction (1−d) serves both UEs according to Eq. 1 outlined above.

The fraction (1−d) of the antenna elements for which the phase shifts are calculated in accordance with Eq. 1 can be determined in accordance with the power distribution. For instance, for equal power distribution, the fraction (1−d) encompasses all available antenna elements; while for power distributions that deviate from the equal power distribution fewer antenna elements are part of the fraction for which the phase shifts are calculated in accordance with Eq. 1.

For the fraction d, the phase shifts can be determined based on the steering vector associated with only the first UE. For large counts of antenna elements, the first and the second UEs obtain normalized beamforming gains of $$\text{Stronger } UE: \left(d + (1-d)\frac{2}{\pi}\right)^2 \quad \text{Weaker } UE: (1-d)^2 \frac{4}{\pi^2}.$$

As can be observed, the sum of these two numbers is less than 0.81 whenever $d < \approx 0.64$. Thus—while a significant amount of signal power is lost—it is still possible to have predictable beamforming gains that are known in advance and remain constant no matter the angular setup.

Another example approach to achieve unequal power distributions—that can be applied in addition or alternatively to the approach outlined above corresponding to partitioning the antenna elements into multiple fractions—is explained next. This approach relies on the summands of the elementwise normalized sum of the steering vectors according to Eq. 1 being weighted in accordance with the power distribution.

This is shown in Eq. 2 defining a respective predefined ruleset $$C(\theta_{o1}, \theta_{o2}) = \frac{\sqrt{w}\,s*(\theta_{o1}) + \sqrt{1-w}\,s*(\theta_{o2})}{\left|\sqrt{w}\,s*(\theta_{o1}) + \sqrt{1-w}\,s*(\theta_{o2})\right|}, \tag{2}$$

where, by changing $0 \leq w \leq 1$, it is possible to control the power distribution (in a nonlinear fashion). When w=0, the split beam is steering towards $\theta_{o2}$ and when w=1, the beam is steered towards $\theta_{o1}$ solely. When w=0.5, one gets equal beamforming gain in both the outgoing directions, i.e., P=1. For any different value of w, one can split the total beamforming gain achieved between the two outgoing directions in a controlled manner.

Another example approach to achieve unequal power distributions—that can be applied in addition or alternatively to the approach outlined above corresponding to partitioning the antenna elements into multiple fractions—is explained next. This approach relies on the combination of steering vectors including geometrical/geodesic means of the elements of the steering vectors along a unit circle in the complex plane.

Formally, this is treated by the following Eq. 3:

$$C(\theta_{o1}, \theta_{o2}) = \exp(-i(\angle[s(\theta_{o1}) \odot s*(\theta_{o2})])(0.5 - 0.5u)) \odot s*(\theta_{o2}) \tag{3}$$

where $\angle[x]: \mathbb{C}^N \to [-\pi, \pi]^N$ and, in words, is a vector of angles (radians) taken elementwise from its argument, and $\odot$ is elementwise (Hadamard) multiplication. u is a parameter determined in accordance with the power distribution. Note that the two Eqs. 1 and 3 coincide for u=0. I.e.,u(P=1)= 0. Further, in Eq. 3, it has been assumed that the direction $\theta_{o1}$ should be served with more power (without loss of generality). Some explanations of the Eq. (3) are provided next: the parameter u enables tailoring of the power distribution P, and in that sense plays a similar role as the parameters d and w above. However, the parameter u does not correspond to a fraction of the CED being reserved for a given output spatial direction (i.e., as parameter d), but rather controls how unequal the power distribution should be (in a non-linear fashion, comparable to w in Eq. 2).

Figure 10:
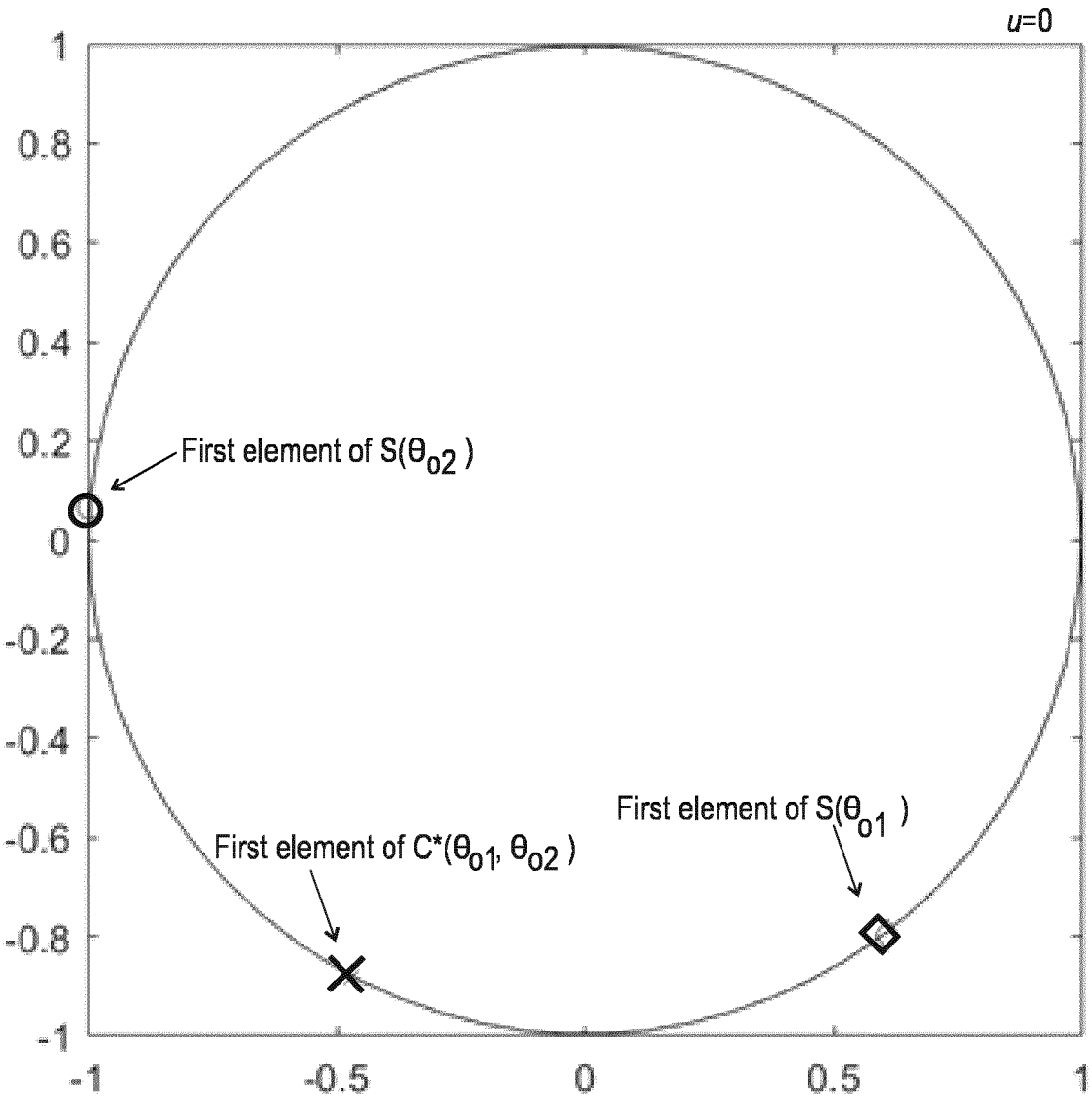
FIG. 10 schematically illustrates aspects with respect to a predefined ruleset for determining MDT spatial filters according to various examples.

The operation of the ruleset according to Eq. 3 can be motivated using a graphical illustration. For this purpose, reference is made to FIG. 10. FIG. 10 only considers the first element of the vector $C^*(\theta_{o1}, \theta_{o2})$, but the remaining elements of the vector can be treated similarly. This value is a complex exponential and therefore lies on the unit circle (note the conjugation). The unit circle is plotted in FIG. 10, together with the first elements of $C^*(\theta_{o1}, \theta_{o2})$, $s(\theta_{o1})$, and $s(\theta_{o2})$, respectively. As can be seen for u=0 (this is what is plotted in FIG. 10), each element of $C^*(\theta_{o1}, \theta_{o2})$ lies exactly in the middle (along the unit circle) of the respective values in $s(\theta_{o1})$, and $s(\theta_{o2})$.

Figure 11:
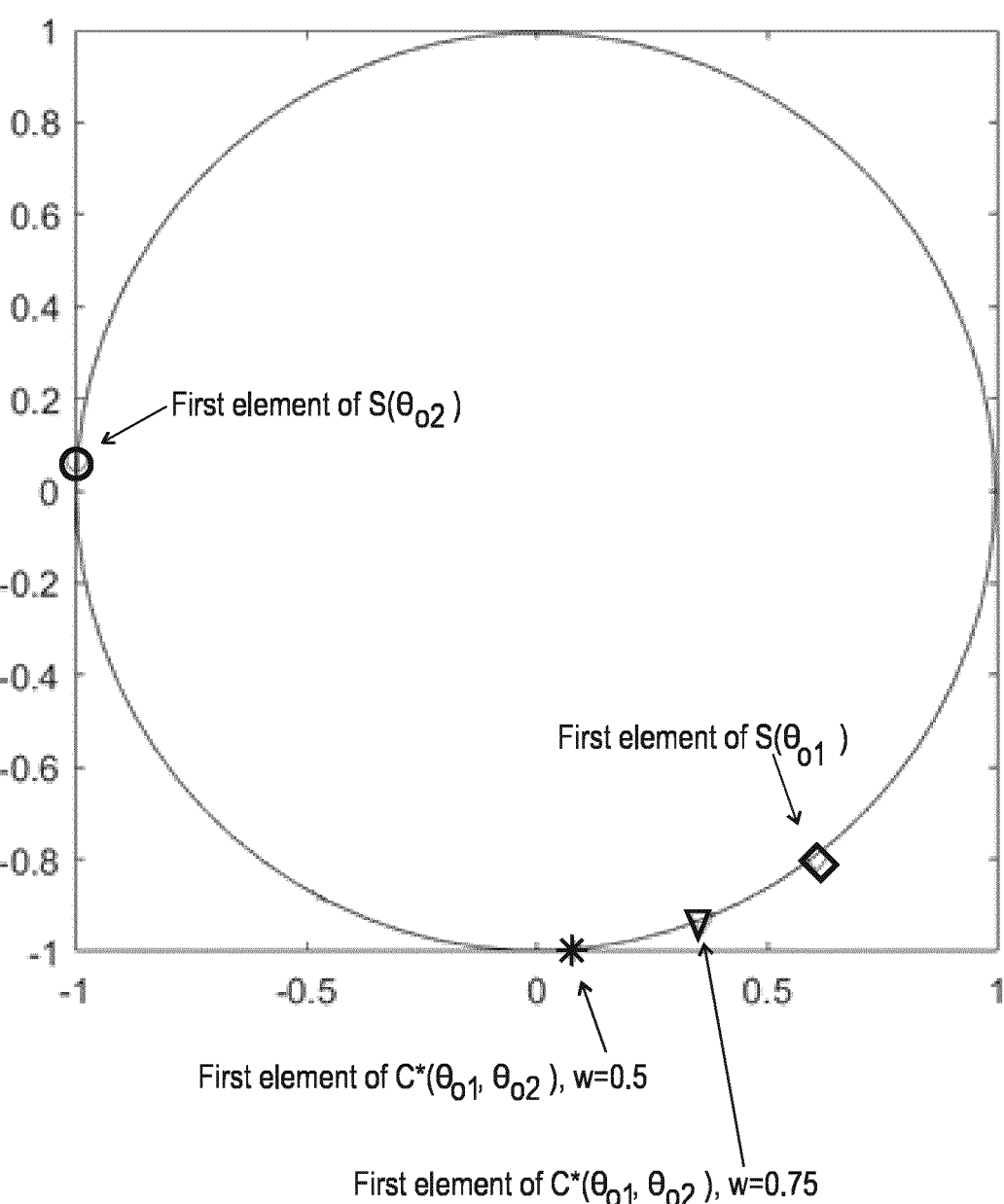
FIG. 11 schematically illustrates aspects with respect to a predefined ruleset for determining MDT spatial filters according to various examples.

FIG. 11 corresponds to FIG. 10, but illustrates two cases for u=0.5 and u=0.75. The resulting values of $C^*(\theta_{o1}, \theta_{o2})$ are shown in FIG. 10. As we can see, for u=0.5, the first value of $C^*(\theta_{o1}, \theta_{o2})$ has moved closer to the first value of $s(\theta_{o1})$, and has covered a fraction u of the arc-distance to first value of $s(\theta_{o1})$. For u=0.75, it has covered a fraction 0.75 of the arc-distance. Thus, by tailoring u it is possible to implement weighted geometrical means of the elements of the steering vector along the unit circle in the complex plane, thereby implementing different power distributions P.

Figure 12:
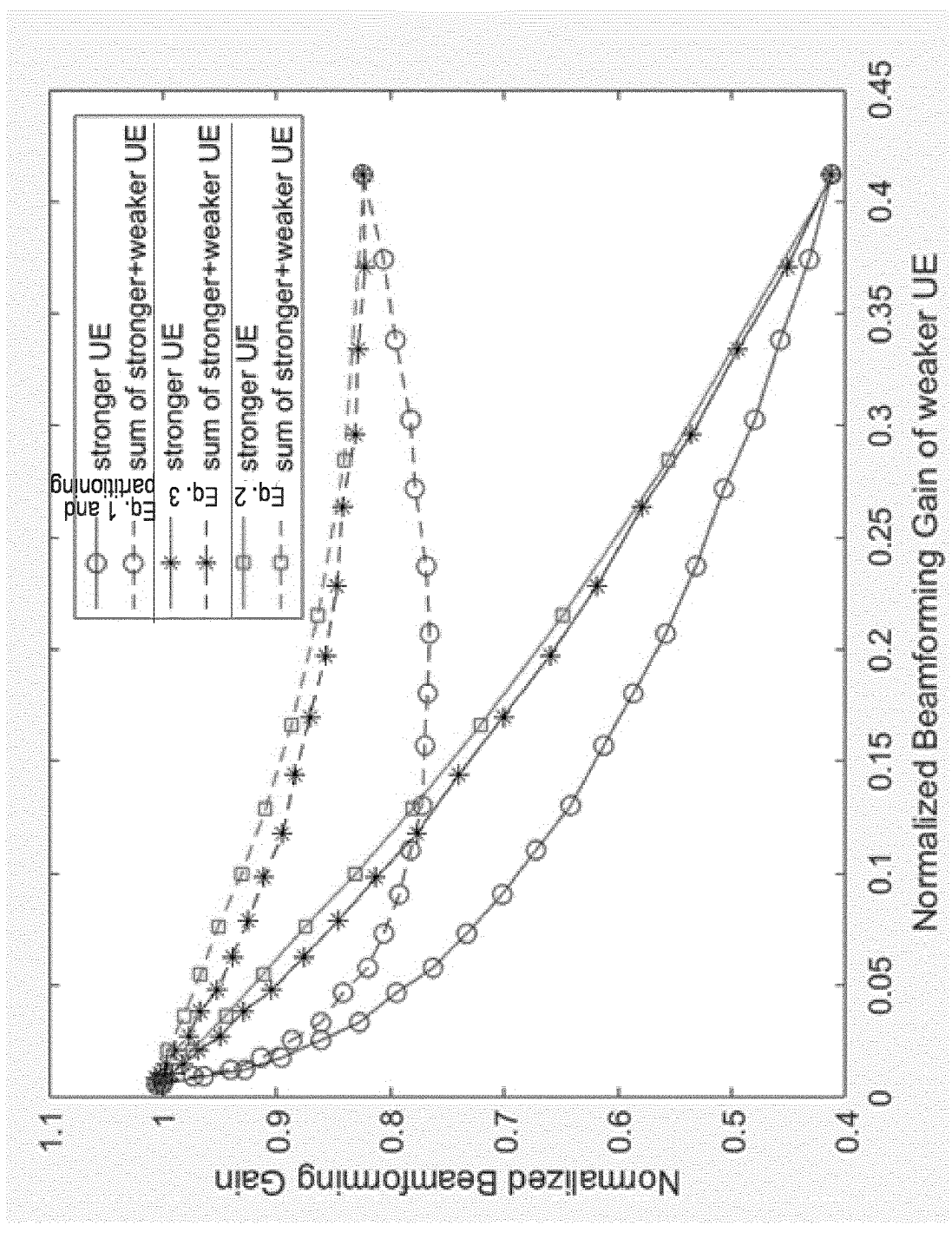
FIG. 12 schematically illustrates a performance of MDT spatial filters determined in accordance with certain predefined rulesets according to various examples.

FIG. 12 illustrates a performance metric for the various methods for varying d (i.e., Eq. 1+partitioning of CED antenna elements; circles in FIG. 12), varying w (i.e., Eq. 2; squares in FIG. 12), and varying u (i.e., Eq. 3, stars in FIG. 12). For the three methods, the reflected power of the stronger UE is plotted in FIG. 12 and the sum reflected power vs the reflected power of the weaker UE. The results are averaged over 5000 random realizations of the two outgoing spatial directions uniformly distributed between −pi/2 and pi/2. As one can see from FIG. 12, varying w and u according to Eq. 2 and Eq. 3 outperforms Eq. 1+partitioning except for the uniform power distribution case (d=0, w=0.5, u=0) for which all three methods coincide.

It should be noted that the Eqs. 1, 2 and 3 are only examples for predefined rulesets and modifications are possible.

In a first example, where $\hat{C}$ denotes the solution from any one of Eqs. 1-3 (then denoted as preliminary phase shifts), then it has been observed that additional phase rotations by 180° of the preliminary phase shifts can be desirable to yield the actual phase shifts:

$$C = \hat{C} \circ f, \text{where } f \in \{-1, +1\}^{M \times 1}$$

where ° is Hadamard product. Moreover, it can be shown that although there are $2^M$ possible f vector-candidates, only M different candidates need to be considered to find an optimal $$f^{opt} = \max_{f \in \{-1, +1\}^{M \times 1}} \|\hat{c} \circ f\|^2.$$

That is, for the case of beam-splitting (fusing) to two output (input) spatial directions, the optimal vector of phase shifts $\hat{c} \circ f^{opt}$ can be found with linear complexity.

Further in a second example, it may be of interest to use more than 2 output spatial directions. Eqs. 1-3 can be generalized to T users, and this is exemplified for Eq. 2. Eq. 2 can be replaced with $$C(\theta_{o1}, \theta_{o2}, \ldots, \theta_{oT}) = \frac{\sum_{t=1}^{T-1} \sqrt{w_t} \, s*(\theta_{ot}) + \sqrt{1 - \sum_{t=1}^{T-1} w_t} \, s*(\theta_{oT})}{\left| \sum_{t=1}^{T-1} \sqrt{w_t} \, s*(\theta_{ot}) + \sqrt{1 - \sum_{t=1}^{T-1} w_t} \, s*(\theta_{oT}) \right|}, \quad (4)$$

where $$0 \le \sum_{t=1}^{T-1} w_t \le 1.$$

As can be seen from Eq, 4, for T output directions, there are T−1 variables that control the power distribution.

Figure 13:
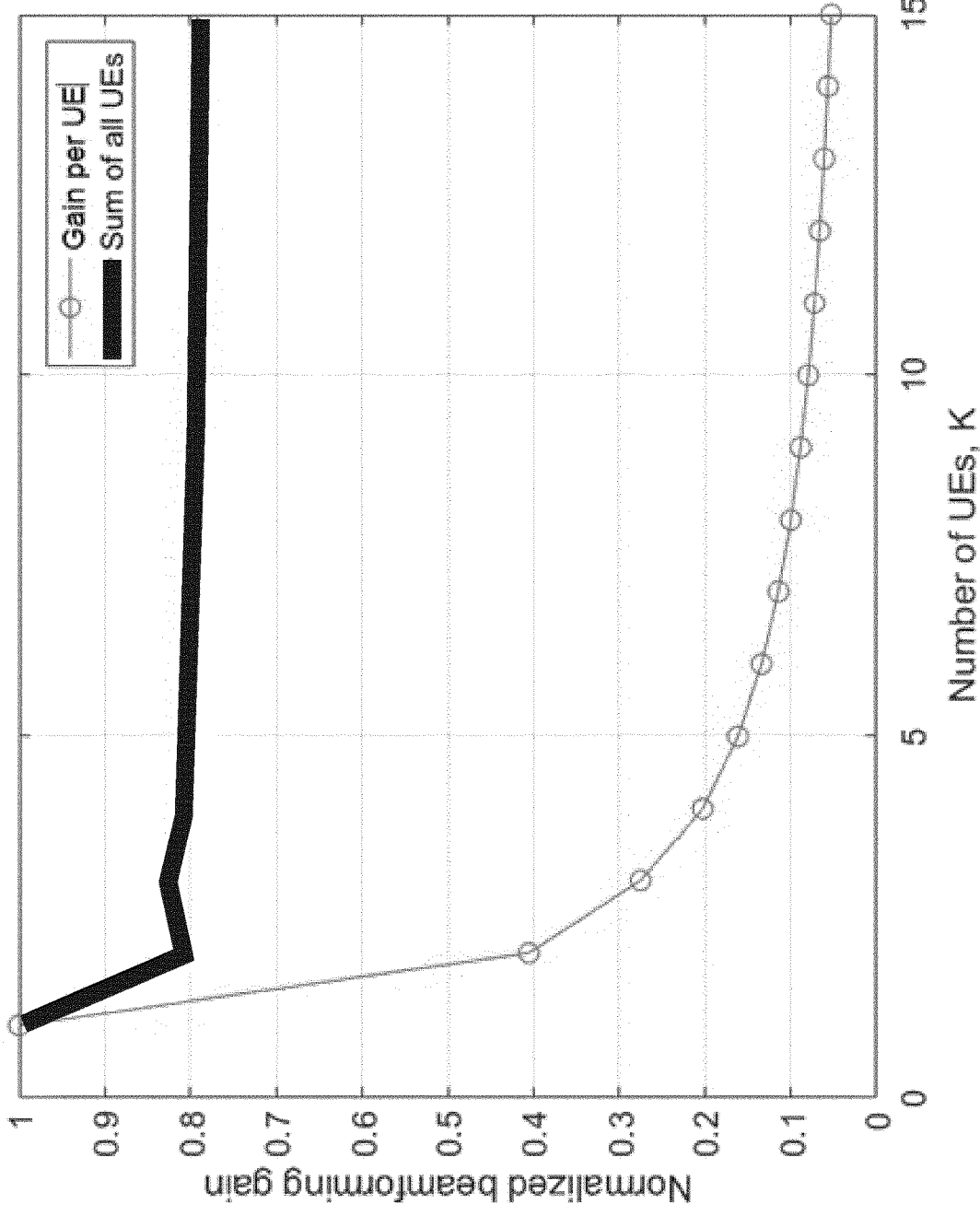
FIG. 13 schematically illustrates a performance of MDT spatial filters determined in accordance with certain predefined rulesets according to various examples.

FIG. 13 illustrates aspects with respect to the performance of serving multiple UEs for 2≤T for a uniform power distribution (each output spatial direction receives the same power), e.g., $$w_t = \frac{1}{T}.$$

In FIG. 13, an asymptotic regime when the number of antennas grows unbounded. FIG. 13 plots the normalized beamforming gain per output spatial direction as a function of T (thin line in FIG. 13). Moreover, the sum of the beamforming gains for the T output directions is plotted (bold line in FIG. 13). As can be seen, the normalized beamforming gain per output direction reduces with T—which is most natural. On the other hand, the total beamforming gain summed over all T UEs is virtually unaffected by the number of UEs, as long as at least two UEs are involved (seen by the flatness of the bold curve).

Figure 14:
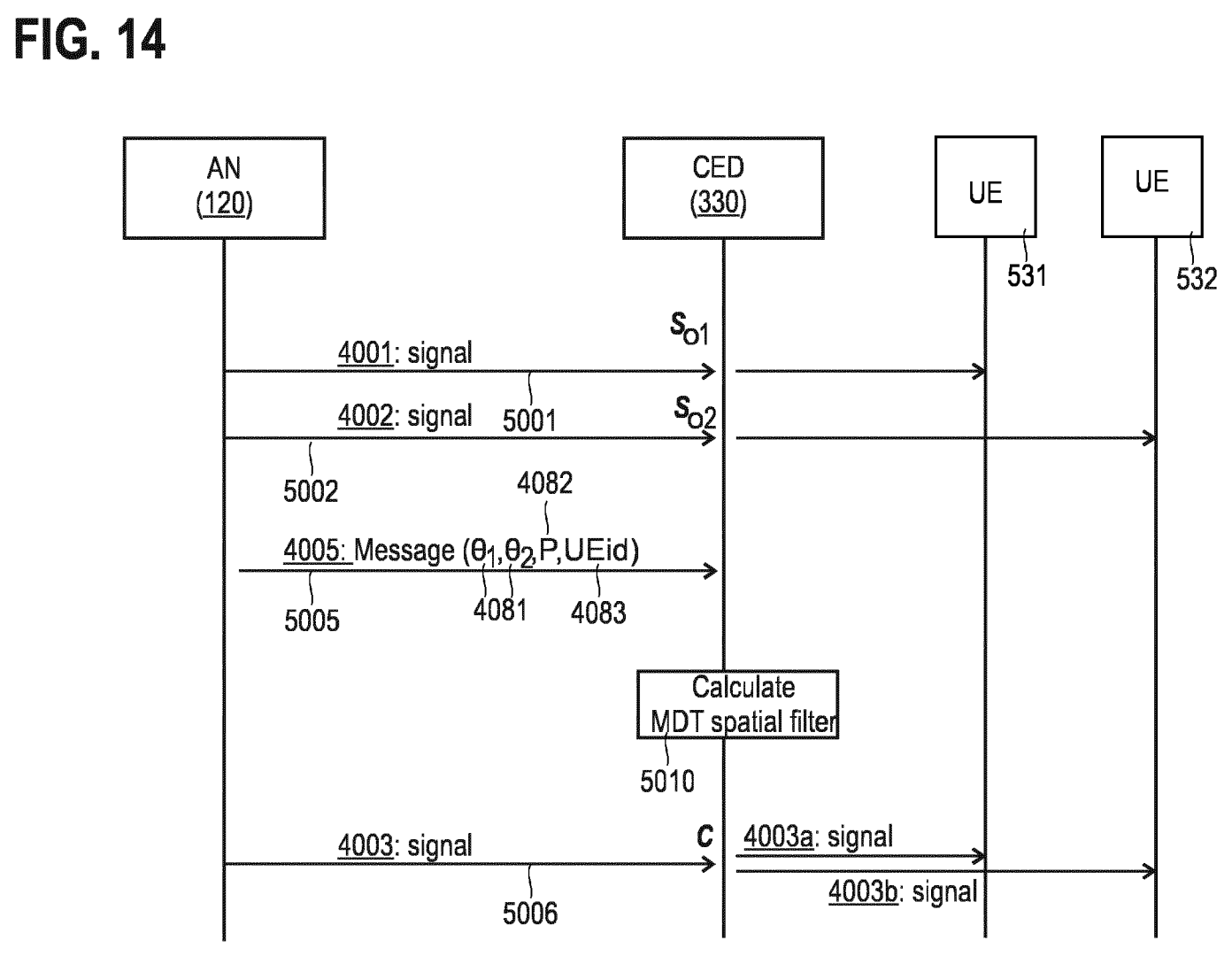

FIG. 14 is a signaling diagram of communication between the AN 120—controlling the CED 330—and the CED 330. FIG. 14 illustrates aspects with respect to configuring the CED 330.

FIG. 14 considers a scenario in which the AN 120 serves UEs 531, 532 via the CED 330 (cf. FIG. 5). The AN 120 is aware of the signal qualities at each UE 531, 532, e.g., Reference Signal Received Power (RSRP) values of DL reference signals. The AN 120 is aware of the link qualities between the AN 120 and the UEs 531, 532.

The AN 120 serves the UE 531 using an SDT spatial filter (defining a corresponding steering vector, $s(\theta_{o1})$) at the CED 330. For instance, the CED 330 can be configured to repeatedly activate this SDT spatial filter at certain reoccurring time slots. In FIG. 14, at 5001, a respective signal 4001 is transmitted by the access node 120 towards the CED 330 in one of those reoccurring time slots; and the signal 4001 is then reflected towards the UE 531 in the respective output spatial direction.

Similarly, the access node 120 serves the UE 532 using another SDT spatial filter (defining a corresponding steering vector $s(\theta_{o2})$) at the CED 330. For instance, the CED 330 can be configured to repeatedly activate this SDT spatial filter at certain reoccurring timeslots (different from the reoccurring time slots during which the UE 531 is served).

In FIG. 14, at 5002, a respective signal 4002 is transmitted by the access node 120 towards the CED 330 in one of those timeslots; the signal 4002 is then reflected towards the UE 532 in the respective output spatial direction.

The AN 120 then intends to configure the CED 330 to use a SIMO MDT spatial filter to contemporaneously reflect incident signal towards both UEs 531, 532 (in addition or as a replacement of the SDT spatial filters). The AN 120 can then provide the message 4005 to the CED 330 at 5005 and the message 4005 can be indicative of the following information:

First, an indication 4081 of the output spatial directions $\theta_1$, $\theta_2$. The output spatial directions could be explicitly indicated, e.g., using azimuth and elevation angle values. The output spatial directions could also be implicitly indicated: A pointer to a predefined setting can be provided, e.g., by informing the CED 330 about the time slots in which the two UEs 531, 532 are currently served at 5001 and 5002.

Second, the power distribution P or a value 4082 indicative thereof, e.g., one of the weights d, w, u discussed in connection with Eqs. 1-4 above. For instance, the AN 120 may determine the power distribution based on a link quality between the AN 120 and each one of the UEs 531 using the respective SDT spatial filters. Channel measurement reports from the UEs 531, 532 can be considered.

Third, an indication 4083 of which of the two UEs that should have more power (only for a non-zero d, and k=1,2). A respective UE ID or identity of the respective output spatial direction $\theta_1$, $\theta_2$ can be provided.

The message 4005 could be a Layer 1, Layer 2, or Layer 3 message.

At box 5010, the CED 330 can then calculate the MDT spatial filter, e.g., using one of the equations 1-4 defined above and based on the steering vectors already used at 5001 and 5002.

After indicating these three parameters 4081-4083, the performance of the beam split is known to the AN 120 (e.g., using a look-up table including values as shown in FIG. 12). As performance is dependent on the precise number of antenna elements at the CED 330 (cf. FIG. 9), the AN 120 can estimate the receive signal strength at the UEs 531, 532 based on the antenna elements and using a respective look-up table or calculation. However, if it is unknown, then the performance is approximately known by assuming that the number of antennas is large so that the asymptotic results dominate the dependency. The AN 120 can then set its transmit power based on the estimated receive signal strength.

Subsequently, the CED 330 can configure its antenna elements to apply the phase shifts accordingly, to thereby reflect an incident signal 4003, at 5015, into the multiple output spatial directions towards, both, the UE 531, as well as the UE 532 (this defines respective output signals 4003a, 4003b).Summarizing, techniques have been disclosed of communicating a capability of a CED to split/branch or merge/bond beams, i.e., to support an MDT. The MDT can support a broadcast or multi-cast communication. The CED can provide this capability to an AN.

The capability of the CED may be only partially transferred to the AN, and the logic for selecting appropriate spatial filters is implemented predominately at the CED.

Further summarizing, aspects of activating or deactivating MDT spatial filters have been disclosed.

Further summarizing, techniques of calculating MDT spatial filters, i.e., calculating respective phase shifts at the antenna elements of the CED, have been disclosed.

Summarizing, at least the following EXAMPLES have been disclosed:

EXAMPLE 1. A method of operating a first communication node (110, 120), CN, wherein the method comprises obtaining a message indicative of a capability of a coverage enhancing device (330), CED, to transmit incident signals received along one or more input spatial directions into one or more output spatial directions, such that a count of the one or more input spatial directions is different than a count of the one or more output spatial directions, wherein the CED (330) is reconfigurable to provide multiple spatial filters, each one of the multiple spatial filters being associated with at least one of the one or more input spatial directions from which incident signals on a radio channel are accepted and with at least one of the one or more output spatial directions into which the incident signals are transmitted by the CED (330).

EXAMPLE 2. The method of operating the first CN according to EXAMPLE 1, wherein obtaining the message indicative of the capability of the CED (330) comprises obtaining the message from the CED (330).

EXAMPLE 3. The method of operating the first CN according to EXAMPLE 1 or 2, wherein the method further comprises providing, in particular to the CED (330), a message indicative of a set of input spatial directions or a set of output spatial directions.

EXAMPLE 4. The method of operating the first CN according to EXAMPLE 3, wherein the method further comprises obtaining, in particular from the CED (330), a message indicative of one or more subsets of the set of input spatial directions or the set of output spatial directions.

EXAMPLE 5. The method of operating the first CN according to EXAMPLE 3 or 4, wherein the method further comprises providing, in particular to the CED (330), a message requesting the CED (330) to apply one or more spatial filters selected according to set of input spatial directions or the set of output spatial directions or the one or more subsets.

EXAMPLE 6. The method of operating the first CN according to EXAMPLE 5, wherein the method further comprises communicating, between the first CN and multiple second CNs (110, 120, 531, 532, 533), via the CED (330), and on a radio link (150), one or more signals encoding payload data, wherein each one of the one or more signals is associated with the one or more spatial filters.

EXAMPLE 7. The method of operating the first CN according to any one of EXAMPLEs 1 to 6, wherein different ones of the one or more input spatial directions or the one or more output spatial directions are associated with different second CNs (110, 120, 531, 532, 533).

EXAMPLE 8. The method of operating the first CN according to any one of EXAMPLEs 1 to 7, wherein the method further comprises obtaining, in particular from the CED (330), a message indicative of a link quality of a radio link (150) associated with the one or more output spatial directions or the one or more input spatial directions.

EXAMPLE 9. The method of operating the first CN according to EXAMPLE 8, wherein the message indicative of the link quality comprises an indication of a minimum link quality of different ones of the one or more output spatial directions or the one or more input spatial directions.

EXAMPLE 10. The method of operating the first CN according to EXAMPLE 8 or 9,
   wherein the message indicative of the link quality comprises an indication of a relative link quality of different ones of the one or more output spatial directions or the one or more input spatial directions.

EXAMPLE 11. The method of operating the first CN according to any one of EXAMPLEs 8 to 10, wherein the method further comprises
   providing, in particular to the CED (330), a request message to provide the message indicative of the link quality.

EXAMPLE 12. The method of operating the first CN according to any one of EXAMPLEs 8 to 11,
   wherein the method further comprises
   providing, in particular to the CED (330), a message indicative of a measured link quality of multiple second CNs (110, 120, 531, 532, 533).

EXAMPLE 13. The method of operating the first CN according to EXAMPLE 12,
   wherein the method further comprises
   providing, in particular to the CED (330), a message indicative of a required link quality associated with the one or more output spatial directions or the one or more input spatial directions EXAMPLE 14. A method of operating a coverage enhancing device, CED (330), wherein the CED (330) is reconfigurable to provide multiple spatial filters, each one of the multiple spatial filters being associated with a respective input spatial direction from which incident signals on a radio channel are accepted and with one or more respective output spatial directions into which the incident signals are transmitted by the CED (330), the method comprising
   providing, to a first communication node, CN, a message indicative of the capability of the CED (330) to transmit incident signals received along one or more input spatial directions into one or more output spatial directions, such that a count of the one or more input spatial directions is different than a count of the one or more output spatial directions.

EXAMPLE 15. The method of operating the CED according to EXAMPLE 14, wherein the method further comprises:
   performing an optimization of a configuration associated with at least some of the multiple spatial filters, the optimization being based on an optimization criterion that depends on multiple signal gains of multiple second CNs served by the first CN via the CED by the incident signals received along the one or more input spatial directions and transmitted into the one or more output spatial directions.

EXAMPLE 16. The method of operating the CED according to EXAMPLE 14 or 15,
   wherein the method further comprises
   obtaining, from the first CN, a message indicative of a set of input spatial directions or a set of output spatial directions.

EXAMPLE 17. The method of operating the CED according to EXAMPLE 16,
   wherein the method further comprises
   providing, to the first CN, a message indicative of one or more subsets of the set of input spatial directions or the set of output spatial directions.

EXAMPLE 18. The method of operating the CED according to EXAMPLE 16 or 17,
   wherein the method further comprises
   obtaining, from the first CN, a message requesting the CED (330) to apply one or more spatial filters selected according to set of input spatial directions or the set of output spatial directions or the one or more subsets.

EXAMPLE 19. The method of operating the CED according to EXAMPLE 18,
   wherein the method further comprises
   transmitting one or more signals communicated between the first CN and multiple second CNs (110, 120, 531, 532, 533) on a radio link (150), the one or more signals encoding payload data, wherein each one of the one or more signals is associated with the one or more spatial filters.

EXAMPLE 20. The method of operating the CED according to any one of EXAMPLEs 14 to 19,
   wherein different ones of the one or more input spatial directions or the one or more output spatial directions are associated with different second CNs (110, 120, 531, 532, 533).

EXAMPLE 21. The method of operating the CED according to any one of EXAMPLEs 14 to 20,
   wherein the method further comprises
   providing, to the first CN, a message indicative of a link quality of a radio link (150) associated with the one or more output spatial directions or the one or more input spatial directions.

EXAMPLE 22. The method of operating the CED according to EXAMPLE 21,
   wherein the message indicative of the link quality comprises an indication of a minimum link quality of different ones of the one or more output spatial directions or the one or more input spatial directions.

EXAMPLE 23. The method of operating the CED according to EXAMPLE 21 or 22,
   wherein the message indicative of the link quality comprises an indication of a relative link quality of different ones of the one or more output spatial directions or the one or more input spatial directions.

EXAMPLE 24. The method of operating the CED according to any one of EXAMPLEs 21 to 23, wherein the method further comprises
   obtaining, from the first CN, a request message to provide the message indicative of the link quality.

EXAMPLE 25. The method of operating the CED according to any one of EXAMPLEs 21 to 24,
   wherein the method further comprises
   obtaining, from the first CN, a message indicative of a measured link quality of multiple second CNs (110, 120, 531, 532, 533).

EXAMPLE 26. The method of operating the CED according to EXAMPLE 25,
   wherein the method further comprises
   obtaining, from the first CN, a message indicative of a required link quality associated with the one or more output spatial directions or the one or more input spatial directions.

EXAMPLE 27. A first communication node (110, 120), CN, comprising a control circuitry configured to
   obtain a message indicative of a capability of a coverage enhancing device (330), CED, to transmit incident signals received along one or more input spatial directions into one or more output spatial directions, such that a count of the one or more input spatial directions is different than a count of the one or more output spatial directions, wherein the CED (330) is reconfigurable to provide multiple spatial filters, each one of the multiple spatial filters being associated with at least one of the one or more input spatial directions from which incident signals on a radio channel are accepted and with at least one of the one or more output spatial directions into which the incident signals are transmitted by the CED (330).

EXAMPLE 28. A coverage enhancing device, CED (330), wherein the CED (330) is reconfigurable to provide multiple spatial filters, each one of the multiple spatial filters being associated with a respective input spatial direction from which incident signals on a radio channel are accepted and with one or more respective output spatial directions into which the incident signals are transmitted by the CED (330), the CED comprising a control circuitry configured to provide, to a first communication node, CN, a message indicative of the capability of the CED (330) to transmit incident signals received along one or more input spatial directions into one or more output spatial directions, such that a count of the one or more input spatial directions is different than a count of the one or more output spatial directions.

EXAMPLE 29. A method of operating a coverage enhancing device (330) comprising multiple antenna elements (434), each one of the multiple antenna elements (434) being configurable to apply a phase shift to an incident signal, wherein the method comprises:

obtaining (8020) a message (4005) for configuring the coverage enhancing device (330) to contemporaneously reflect the incident signal (4003) incident along an input spatial direction into multiple output spatial directions, the message being indicative of a power distribution between output signals (4003a, 4004b) reflected along different ones of the multiple output spatial directions, and upon receiving the message (4005) and in accordance with the power distribution, configuring the multiple antenna elements (434) to apply the phase shifts to reflect the incident signal (4003) into the multiple output spatial directions.

EXAMPLE 30. The method of EXAMPLE 29, wherein the message (4005) comprises a data element (4082) that comprises a value defining the power distribution.

EXAMPLE 31. The method of EXAMPLE 30, wherein the message (4005) selectively comprises the data element (4082) and an absence of a respective data element (4082) in the message (4005) indicates a default value of the power distribution.

EXAMPLE 32. The method of any one of EXAMPLES 29 to 31, wherein the message (4005) is further indicative of each one of the multiple output spatial directions.

EXAMPLE 33. The method of EXAMPLE 32, wherein the message (4005) comprises a pointer to a predefined setting of the multiple output spatial directions.

EXAMPLE 34. The method of any one of EXAMPLES 29 to 33, further comprising:

upon receiving the message (4005) and in accordance with the power distribution: executing a predefined ruleset to determine the phase shifts.

EXAMPLE 35. The method of EXAMPLE 34, wherein the predefined ruleset comprises a continuous functional dependency of the phase shifts on one or more input variables, wherein executing the predefined ruleset comprises calculating the phase shifts using a value associated with the power distribution as an input variable of the continuous functional dependency.

EXAMPLE 36. The method of EXAMPLE 34 or 35, wherein the predefined ruleset determines the phase shifts for at least a fraction of the antenna elements based on a combination of beamforming vectors associated with each one of the multiple output spatial directions with respect to the input spatial direction.

EXAMPLE 37. The method of EXAMPLE 36, wherein the combination of beamforming vectors comprises an elementwise normalized sum of complex conjugates of the beamforming vectors.

EXAMPLE 38. The method of EXAMPLE 36 or 37, wherein the predefined ruleset determines the fraction of the antenna elements in accordance with the power distribution, wherein the predefined ruleset determines the phase shift for a further fraction of the antenna elements that is complementary to the fraction of antenna elements solely based on the beamforming vector associated with a given one of the multiple output spatial directions to which a higher power is distributed.

EXAMPLE 39. The method of EXAMPLE 38, wherein summands of the elementwise normalized sum of the steering vectors are weighted in accordance with the power distribution.

EXAMPLE 40. The method of EXAMPLE 36, wherein the combination of steering vectors comprises geometrical means of elements of the steering vectors along a unit circle in the complex plane.

EXAMPLE 41. The method of EXAMPLE 40, wherein geometrical means are weighted in accordance with the power distribution.

EXAMPLE 42. The method of any one of EXAMPLEs 36 to 41, wherein the predefined ruleset comprises a phase rotation by 180° of preliminary phase shifts obtained from the combination of the steering vectors.

EXAMPLE 43. The method of any one of EXAMPLES 29 to 42, further comprising:

calculating the phase shifts based on multiple sets of further phase shifts used to serially reflect further incident signals into the multiple output spatial directions.

EXAMPLE 44. A method of controlling a coverage enhancing device (330) comprising multiple antenna elements (434), each one of the multiple antenna elements (434) being configurable to apply a phase shift to an incident signal (4003), wherein the method comprises:

providing, to the coverage enhancing device (330), a message (4005) for configuring the coverage enhancing device (330) to reflect the incident signal incident along an input spatial direction into multiple output spatial directions, the message (4005) being indicative of a power distribution between output signals (4003a, 4003b) reflected along different ones of the multiple output spatial directions.

EXAMPLE 45. The method of EXAMPLE 44, further comprising:

> determining the power distribution based on link qualities obtained from multiple wireless devices (110, 531, 532, 533) that are served via the multiple output spatial directions.

EXAMPLE 46. The method of EXAMPLE 44 or 45,

> estimating a receive signal power at multiple communication nodes associated with the multiple output spatial directions based on a count of antenna elements of the coverage enhancing device.

EXAMPLE 47. A method of operating a coverage enhancing device (330) comprising multiple antenna elements (434), each one of the multiple antenna elements (434) being configurable to apply a phase shift to incident signals, > wherein the method comprises:
>
> > obtaining a message (4005) for configuring the coverage enhancing device (330) to contemporaneously reflect incident signals received along multiple input spatial directions into an output spatial direction, the message (4005) being indicative of a power distribution between multiple contributions to an output signal that is reflected along the output spatial direction, the multiple contributions to the output signal being associated with different ones of the incident signals, and
> >
> > upon receiving the message, applying the phase shifts to reflect the incident signals received along multiple input spatial directions into the output spatial direction.

EXAMPLE 48. A coverage enhancing device comprises a processor and multiple antenna elements, each one of the multiple antenna elements being configurable to apply a phase shift to an incident signal, wherein the processor is configured to:

> obtain (8020) a message (4005) for configuring the coverage enhancing device to contemporaneously reflect the incident signal incident along an input spatial direction into multiple output spatial directions, the message being indicative of a power distribution between output signals reflected along different ones of the multiple output spatial directions, and
>
> upon receiving the message and in accordance with the power distribution, configure the multiple antenna elements to apply the phase shifts to reflect the incident signal into the multiple output spatial directions.

EXAMPLE 49. The coverage enhancing device of EXAMPLE 48, wherein the processor is configured to perform the method of any one of EXAMPLEs 29 to 43.

EXAMPLE 50. A device (110, 120, 531, 532, 533) comprising a processor and configured for controlling a coverage enhancing device (330) comprising multiple antenna elements (434), each one of the multiple antenna elements (434) being configurable to apply a phase shift to an incident signal (4003), > wherein the processor is configured to:
>
> provide, to the coverage enhancing device (330), a message (4005) for configuring the coverage enhancing device (330) to reflect the incident signal incident along an input spatial direction into multiple output spatial directions, the message (4005) being indicative of a power distribution between output signals (4003a, 4003b) reflected along different ones of the multiple output spatial directions.

EXAMPLE 51. The device of EXAMPLE 50, wherein the processor is configured to perform the method of any one of EXAMPLEs 44 to 46.

EXAMPLE 52. A coverage enhancing device comprising a processor and multiple antenna elements, each one of the multiple antenna elements being configurable to apply a phase shift to an incident signal, wherein the processor is configured to:

> obtain a message (4005) for configuring the coverage enhancing device (330) to contemporaneously reflect incident signals received along multiple input spatial directions into an output spatial direction, the message (4005) being indicative of a power distribution between multiple contributions to an output signal that is reflected along the output spatial direction, the multiple contributions to the output signal being associated with different ones of the incident signals, and
>
> upon receiving the message, applying the phase shifts to reflect the incident signals received along multiple input spatial directions into the output spatial direction.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various techniques have been disclosed in the context of a passive CED. Here, multiple antenna elements apply phase shifts. It would be similarly possible that the techniques disclosed herein are applied for active CED where the antenna elements also apply respective gains changing the amplitude. For example, phase shifts can be implemented as time delays.

For further illustration, various examples have been disclosed for a SIMO MDT. Similarly, respective techniques may be directly applicable to MISO MDT, under the assumption of reciprocity of the respective MDT spatial filters.

The invention claimed is:

1. A method of operating a coverage enhancing device comprising multiple antenna elements, each one of the multiple antenna elements being configurable to apply a phase shift to an incident signal, > wherein the method comprises:
>
> > obtaining a message for configuring the coverage enhancing device to contemporaneously reflect the incident signal incident along an input spatial direction into multiple output spatial directions, the message indicating a power distribution ratio between output signals reflected along different ones of the multiple output spatial directions, and
> >
> > upon receiving the message and in accordance with the power distribution ratio, determining, by the coverage enhancing device, phase shifts based on the power distribution ratio included in the message and configuring the multiple antenna elements to apply the phase shifts to reflect the incident signal into the multiple output spatial directions.

2. The method of claim 1,

> wherein the message comprises a data element that comprises a value defining the power distribution ratio.

3. The method of claim 2,

> wherein the message selectively comprises the data element and an absence of a respective data element in the message indicates a default value of the power distribution ratio.

4. The method of claim 1,

> wherein the message is further indicative of each one of the multiple output spatial directions.

5. The method of claim 4, wherein the message comprises a pointer to a predefined setting of the multiple output spatial directions.

6. The method of claim 1, further comprising:

upon receiving the message and in accordance with the power distribution ratio: executing a predefined ruleset to determine the phase shifts.

7. The method of claim 6, wherein the predefined ruleset comprises a continuous functional dependency of the phase shifts on one or more input variables, wherein executing the predefined ruleset comprises calculating the phase shifts using a value associated with the power distribution ratio as an input variable of the continuous functional dependency.

8. The method of claim 6, wherein the predefined ruleset determines the phase shifts for at least a fraction of the antenna elements based on a combination of beamforming vectors associated with each one of the multiple output spatial directions with respect to the input spatial direction.

9. The method of claim 8, wherein the combination of beamforming vectors comprises an elementwise normalized sum of complex conjugates of the beamforming vectors.

10. The method of claim 8, wherein the predefined ruleset determines the fraction of the antenna elements in accordance with the power distribution ratio, wherein the predefined ruleset determines the phase shift for a further fraction of the antenna elements that is complementary to the fraction of antenna elements solely based on the beamforming vector associated with a given one of the multiple output spatial directions to which a higher power is distributed.

11. The method of claim 10, wherein summands of the elementwise normalized sum of the steering vectors are weighted in accordance with the power distribution ratio.

12. The method of claim 8, wherein the combination of steering vectors comprises geometrical means of elements of the steering vectors along a unit circle in the complex plane.

13. The method of claim 8, wherein the predefined ruleset comprises a phase rotation by 180° of preliminary phase shifts obtained from the combination of the steering vectors.

14. The method of claim 1, further comprising:

calculating the phase shifts based on multiple sets of further phase shifts used to serially reflect further incident signals into the multiple output spatial directions.

15. A method of controlling a coverage enhancing device comprising multiple antenna elements, each one of the multiple antenna elements being configurable to apply a phase shift to an incident signal, wherein the method comprises:

providing, to the coverage enhancing device, a message for causing the coverage enhancement device to determine phase shifts based on a power distribution ratio included in the message and to reflect, based on the phase shifts, the incident signal incident along an input spatial direction into multiple output spatial directions, the power distribution ratio being a power distribution between output signals reflected along different ones of the multiple output spatial directions.

16. The method of claim 15, further comprising:

determining the power distribution ratio based on link qualities obtained from multiple wireless devices that are served via the multiple output spatial directions.

17. The method of claim 15, estimating a receive signal power at multiple communication nodes associated with the multiple output spatial directions based on a count of antenna elements of the coverage enhancing device.

18. A coverage enhancing device comprises a processor and multiple antenna elements, each one of the multiple antenna elements being configurable to apply a phase shift to an incident signal, wherein the processor is configured to:

obtain a message for configuring the coverage enhancing device to contemporaneously reflect the incident signal incident along an input spatial direction into multiple output spatial directions, the message indicating a power distribution ratio between output signals reflected along different ones of the multiple output spatial directions, and upon receiving the message and in accordance with the power distribution ratio, determine, by the coverage enhancing device, phase shifts based on the power distribution ratio included in the message and configure the multiple antenna elements to apply the phase shifts to reflect the incident signal into the multiple output spatial directions.

19. The coverage enhancing device of claim 18, wherein the processor is configured to perform the method of claim 2.

* * * * *